United States Patent
McFadyen et al.

(10) Patent No.: US 8,212,945 B2
(45) Date of Patent: Jul. 3, 2012

(54) METHOD AND APPARATUS FOR CALIBRATING A PROJECTOR FOR IMAGE WARPING

(75) Inventors: Doug McFadyen, Delta (CA); George Lyons, Langley (CA); Tatiana Pavlovna Kadantseva, Vancouver (CA)

(73) Assignee: Seiko Epson Corporation, Tokyo (JP)

( * ) Notice: Subject to any disclaimer, the term of this patent is extended or adjusted under 35 U.S.C. 154(b) by 306 days.

(21) Appl. No.: 12/752,275

(22) Filed: Apr. 1, 2010

(65) Prior Publication Data

US 2011/0242332 A1 Oct. 6, 2011

(51) Int. Cl.
*H04N 3/23* (2006.01)
*H04N 9/31* (2006.01)

(52) U.S. Cl. ........ 348/745; 348/746; 348/744; 348/806; 345/647; 359/443; 353/69

(58) Field of Classification Search ................. 348/745, 348/746, 744, 756, 747, 806; 359/443, 456, 359/453, 447; 353/69; 349/647, 645, 646
See application file for complete search history.

(56) References Cited

U.S. PATENT DOCUMENTS

| | | | |
|---|---|---|---|
| 7,412,113 B2 | 8/2008 | Morichika et al. | |
| 7,470,032 B2 | 12/2008 | Damera-Venkata et al. | |
| 8,013,904 B2 * | 9/2011 | Tan et al. | 348/222.1 |
| 2006/0192925 A1 | 8/2006 | Chang | |
| 2008/0062164 A1 * | 3/2008 | Bassi et al. | 345/214 |

OTHER PUBLICATIONS

Projective Mappings for Image Warping, Paul Heckbert, Sep. 26, 1995, (pp. 1-5).

* cited by examiner

*Primary Examiner* — Jefferey Harold
*Assistant Examiner* — Jean W Desir
(74) *Attorney, Agent, or Firm* — Mark P. Watson

(57) ABSTRACT

A calibration image including dots and scale points is projected at first and second display surfaces. A location of a scale point may be modified. A location for a registration point is determined and the registration point is added to the calibration image. The projected calibration image is captured. A location of the captured registration point and locations captured scale points are identified. Captured dots that are projected onto the first display surface and their locations are identified. Each of the captured dots identified as being projected onto the first display surface are mapped to a corresponding dot of the calibration image. Dots of the calibration image that are not projected onto the first display surface are identified, locations of each of the identified dots are determined, and a synthetic dot is added to the captured image for each identified dot. The captured image may be provided as input to a process for determining one or more inverse offsets.

31 Claims, 18 Drawing Sheets

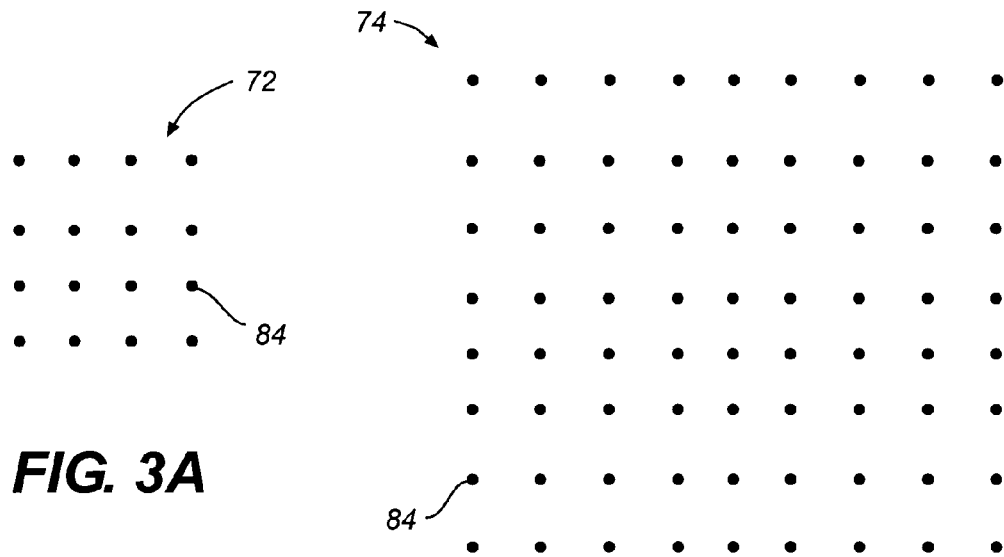
FIG. 3A
FIG. 3B
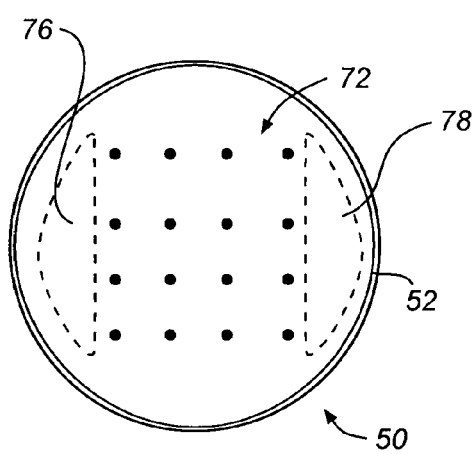
FIG. 3C
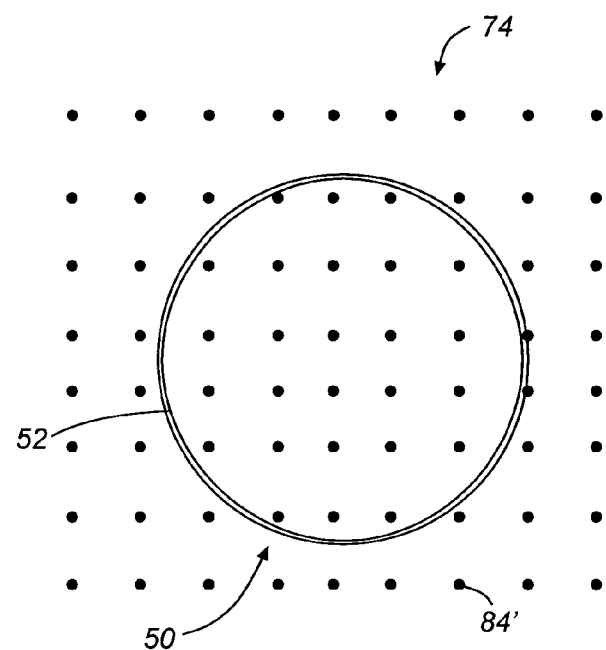
FIG. 3D

METHOD AND APPARATUS FOR CALIBRATING A PROJECTOR FOR IMAGE WARPING

FIELD

This specification describes embodiments that relate to the field of image projection. More particularly, this specification describes systems, methods, and apparatus for calibrating a projector that projects one or more warped images onto a surface that may be non-planar.

BACKGROUND

When a two-dimensional source image is projected onto a planar surface, an enlarged version of the image appears on the surface. The projected image will appear as an accurate representation of the source image, albeit at a larger scale, provided that the optical axis of projection is substantially normal to the planar surface. If the same two-dimensional source image is projected normally onto a non-planar surface (or is not projected normally onto a planar surface), however, the projected image will appear distorted.

One way to prevent image distortion when projecting an image onto a non-planar surface is to place a distortion-correcting lens in the optical path. The use of lenses, however, has several drawbacks. First, lenses are expensive. Second, a particular lens may be suitable only for a single surface, making lens use an inflexible solution. Thus, it may not be possible to use a projector having a distortion-correcting lens with multiple different non-planar surfaces if the topographies of the surfaces are very different. Alternatively, it may be necessary to mount the lens or lenses in a manner in which their positions are mechanically adjustable. Mechanically adjusting lens position can be time consuming, and providing an apparatus for mechanically lens adjustment can be expensive.

Another approach for preventing image distortion when projecting a two-dimensional source image onto a non-planar surface involves pre-distorting the image before projecting it. This pre-distortion is sometimes referred to as "warping" the image. This approach requires determining a function that defines the topography of the display surface and determining the inverse of the function. The inverse topographic function is applied to a desired source image in digital form to pre-distort or pre-warp the source image. When the pre-warped source image is projected onto the surface, the warping of the image compensates for the non-planar topography of the surface to produce an image that appears substantially undistorted.

Methods and apparatus for correcting distortion by warping a source image require knowledge of a topographic function suitable for a particular surface. Calibrating a projection system, apparatus, or process may include a variety of procedures, one of which is obtaining the topographic function for the display surface. Known calibration procedures are suitable for applications where the projected image is smaller than the display surface, but may encounter a problem in other applications where it is desired to project the source image out to the outer edges of the display surface. This problem is particularly significant where the shape of the source image and the two-dimensional profile of the display surface when viewed from a front or back side are different.

Accordingly, there is a need for improved systems, methods, and apparatus for calibrating a projector that projects warped images onto a non-planar surface.

SUMMARY

A method for creating input for an image warping calibration process includes projecting a calibration image with a projector at a first display surface and one or more second display surfaces. The calibration image includes four or more dots and three or more scale points. The locations of the dots and scale points are defined in a first coordinate space. The method includes determining a location for a registration point in the first coordinate space and adding the registration point to the calibration image. The method also includes capturing the projected calibration image with an imaging device. The captured image includes a captured registration point, captured scale points, and captured dots. In addition, the method includes identifying a location of the captured registration point in a second coordinate space and identifying a location of each captured scale point in the second coordinate space. Further, the method includes identifying captured dots that are projected onto the first display surface and their locations in the second coordinate space. Moreover, the method includes mapping each of the captured dots identified as being projected onto the first display surface to a corresponding dot of the calibration image. The method also includes identifying dots of the calibration image that are not projected onto the first display surface, determining locations of each of the dots identified as not being projected onto the first display surface in the second coordinate space, and adding a synthetic dot to the captured image for each dot identified as not being projected onto the first display surface.

In one embodiment, the method includes modifying a location of one or more of the scale points. A location of a scale point may be modified so that it is projected onto one or more second display surfaces. In one embodiment, the method includes identifying a location for the each of the scale points in the second coordinate space subsequent to modifying the location of the one or more scale points.

In one embodiment, the calibration image includes four scale points. In one embodiment, the method includes providing the captured image as input to a process for determining one or more inverse offsets. In one embodiment, the method includes performing a projective mapping as part of the determining of locations of each of the dots identified as not being projected onto the first display surface in the second coordinate space includes.

Also disclosed are embodiments directed to a system and a computer program product for creating input for an image warping calibration process.

This summary is provided only for generally determining what follows in the drawings, Detailed Description, and Claims. This summary is not intended to fully describe the invention. As such, it should not be used limit the scope of the invention. Objects, features, and advantages of the invention will be readily understood upon consideration of the drawings, Detailed Description, and Claims.

DETAILED DESCRIPTION OF THE DRAWINGS

Reference will now be made in detail to specific embodiments, examples of which are illustrated in the accompanying drawings. Wherever possible, the same reference numbers are used in the drawings and the description to refer to the same or like parts.

FIGS. 1A, 1B, and 1C show perspective, front, and side views, respectively, of a first example of a first display surface.

FIG. 3A illustrates a first example of a calibration image.

FIG. 3B illustrates a second example of a calibration image.

FIG. 3C illustrates the calibration image of FIG. 3A being projected onto the display surface of FIG. 1A-C.

FIG. 3D illustrates the calibration image of FIG. 3B being projected onto the display surface of FIG. 1A-C.

DETAILED DESCRIPTION

Figure 1A:
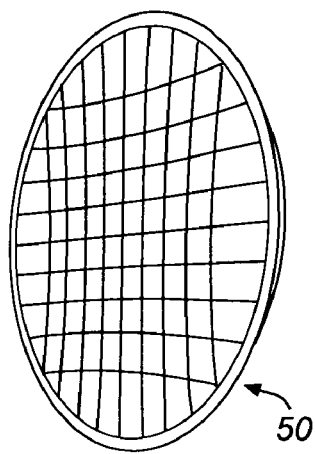

Particular details of exemplary embodiments are set forth in the description that follows. The principles of the invention may be practiced without one or more of these details. In addition, other details may not be described in this description because they are well known in the art and unnecessary for understanding the principles of the invention. It is contemplated that one of ordinary skill in the art will understand which details are not critical for practicing the invention and which details are unnecessary for understanding the invention.

Embodiments described in this specification may be used with methods, systems, and apparatus for projecting an image onto a non-planar surface that include or rely on a calibration process requiring the capturing of a calibration image in its entirety. In addition, embodiments may be used with projection methods, systems, and apparatus that do not require the capture of a calibration image in its entirety.

Embodiments described in this specification may be used with the methods, systems, and apparatus for projecting an image onto a non-planar surface that are described in our co-pending patent applications: U.S. patent application Ser. No. 11/550,180 (Atty. Docket No. VP247), entitled "Calibration Technique for Heads Up Display" (App. '180); U.S. patent application Ser. No. 11/550,153 (Atty. Docket No. VP248), entitled "Method and Apparatus for Rendering an Image Impinging Upon a Non-Planar Surface" (App. '153); U.S. patent application Ser. No. 11/550,389 (Atty. Docket No. VP250), entitled "Heads Up Display System" (App. '389); and U.S. patent application Ser. No. 11/550,392 (Atty. Docket No. VP251), entitled "Warp Image Circuit" (App. '392). The content of these co-pending applications ('180, '153, '389, and '392) are hereby incorporated by reference in their entirety. It should be understood, however, that the embodiments described in this specification are not limited for use only with the methods, systems, and apparatus disclosed in these co-pending applications. The embodiments described in this specification may be used with any methods, systems, and apparatus for projecting an image onto a non-planar surface that include or rely on a calibration process requiring the capturing of a calibration image in its entirety.

Generally, an image projected onto a non-planar surface will appear distorted. One way to minimize or eliminate this type of distortion is to pre-distort or warp the "source image" before projecting it. In order to warp the source image, it is necessary to determine a function that defines the topography of the non-planar surface onto which the image will be projected. The inverse of the topographic function may then be applied to the source image to pre-distort or warp it before projecting it. Obtaining the topographic function, together with other procedures, may be referred to in this specification generally as "calibrating" a projection system, apparatus, or process. Obtaining a topographic function for a particular non-planar surface may require projecting a "calibration image" onto the surface and then capturing the projected calibration image.

Figure 1C:
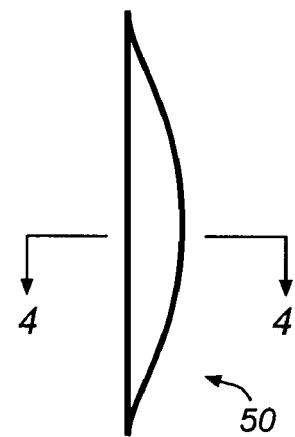
Figure 1B:
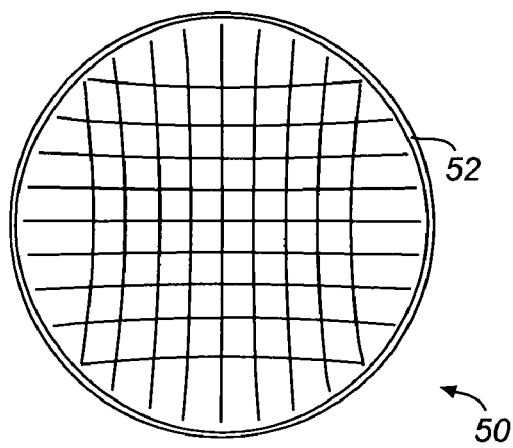

FIGS. 1A, 1B, and 1C show perspective, front, and side views, respectively of one example of a three-dimensional first display surface 50. As shown in FIG. 1B, the first display surface 50 has a circular two-dimensional profile when viewed from a "front" or viewing side. As shown in FIG. 1C, the first display surface 50 is a concave surface, somewhat similar to a hollow hemisphere, though having less curvature than a hemisphere.

Figure 2:
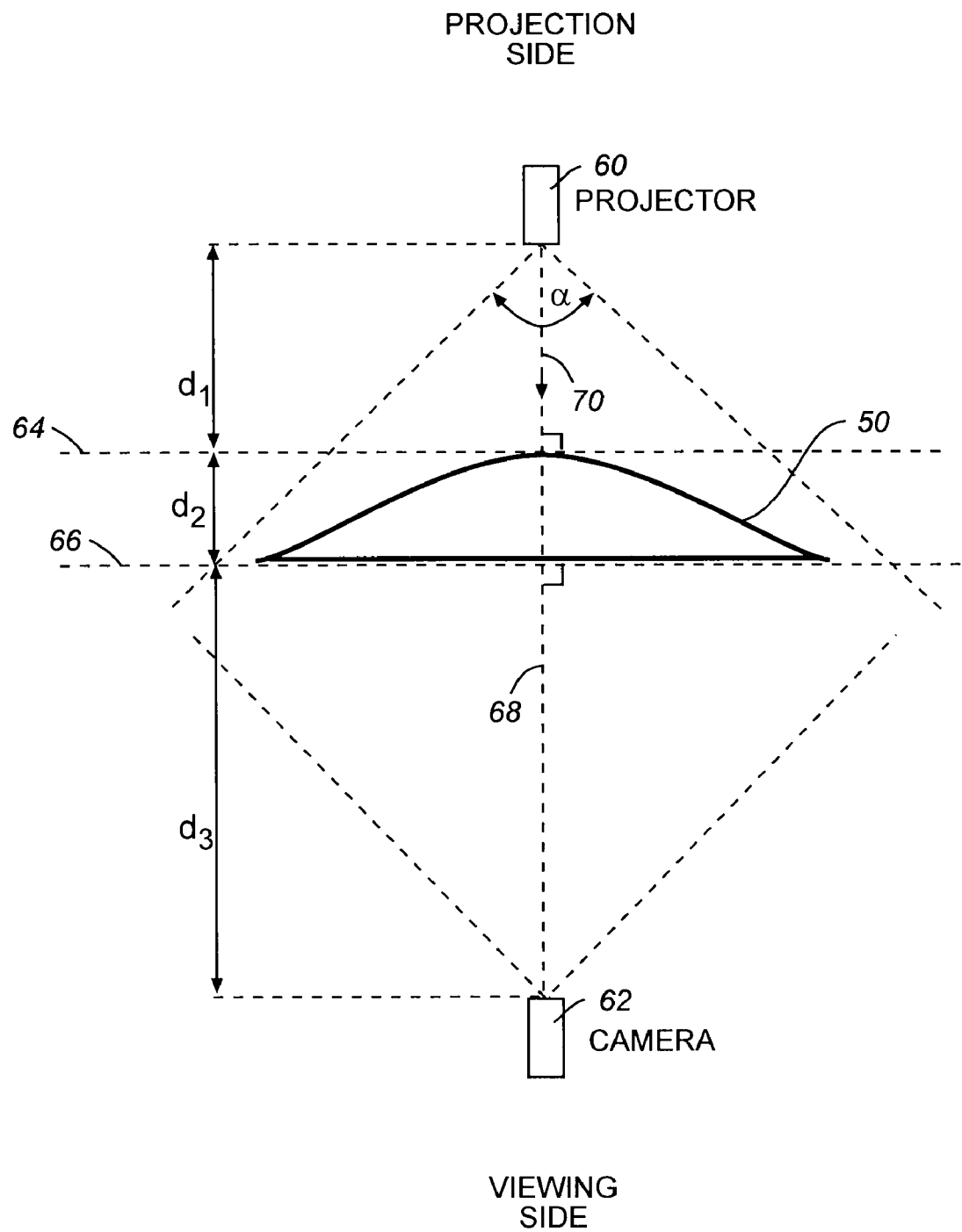
FIG. 2 illustrates an arrangement of the first display surface of FIG. 1 with respect to a projector and an imaging device.

FIG. 2 depicts a plan view of an arrangement of the first display surface 50 with respect to a projector 60 and an imaging device ("camera") 62. In FIG. 2, the first display surface 50 is shown in a cross-sectional view as cut along a line 4-4 of FIG. 1C. In addition, in one embodiment the projector 60 may be located on a back or projection side of the first display surface while the camera 62 may be located on a front or viewing side of the first display surface 50. The first display surface 50 may be may be transparent enough that a projected image may be seen from the viewing side. For example, the first display surface 50 may be Plexiglas that is combined with or which is infused with a dye or pigment. As one example application, the projector 60 and first display surface 50 may be used in a kiosk-type display that may be exhibited at a trade show. The kiosk-type display may be disassembled for transport and storage, and re-assembled for use. Calibration is typically required each time the kiosk-type display is re-assembled. Distances between the projector 60 and the camera 62, and the first display surface may vary depending on space available for assembly. The camera 62 may be employed during a calibration process and then removed after calibration is complete.

While distances between the projector 60 and the camera 62, and the first display surface may vary in different assemblies, FIG. 2 illustrates how distances may be defined. It can be seen that the projector 60 and camera 62 are located at particular distances from the first display surface 50. The projector 60 may be located at a first distance "D1" from the first display surface 50. Because the first display surface 50 is non-planar, the distance D1 may be an average distance or an approximation of the average distance, e.g., D1=d1+(d2/2), where d1 is generally significantly larger than d2. As one example, d1 may be eight feet and d2 may be eight inches so that D1 equals 100 in. (D1=d1+d2/2=96 in.+4 in.=100 in.). In general, the distance D1 is a distance at which the image projected by the projector 60 is substantially in focus. In addition, the distance D1 may be a distance at which a calibration image projected by the projector 60 extends beyond the outer edges of the first display surface 50. In this regard, the angle of projection a of the projector 60 may be such that a calibration image larger than the first surface 50 is projected at the first distance D1. While it is not critical that the distance D1 be such that every projected source image always extends beyond the outer edges of the first display surface 50, it is important that the projected calibration image extend beyond the outer edges of the first display surface 50 during the calibration process. The camera 62 may be located at second distance "D2" from the first display surface 50. Like D1, the distance D2 may be an average distance or an approximation of the average distance, e.g., D2=d3+(d2/2), where d3 is generally significantly larger than d2. In general, the distance D1 is a distance at which the field of view of the camera 62 includes the entire first display surface plus some additional area surrounding the first display surface 50.

FIG. 2 also shows two imaginary planes 64, 66. The imaginary plane 64 may be tangent to the first display surface 50 at one or more points furthest from the camera 62. The imaginary plane 66 may be tangent to the first display surface at one or more points closest to the camera 102. The imaginary planes 64 and 66 may be exactly or approximately parallel. (One of ordinary skill in the art will understand that "approximately" parallel, stated in terms of degrees, typically may mean between 1-10 degrees, depending on distances involved in a particular assembly.) In addition, an optical axis 68 of the camera 62 may be exactly or approximately normal to one of the imaginary planes 64, 66. In addition, an optical axis 70 of the projector 60 may be exactly or approximately normal to one of the imaginary planes 64, 66. (One of ordinary skill in the art will understand that "approximately" normal, stated in terms of degrees, typically may mean within between 1-15 degrees of 90 degrees, depending on distances involved in a particular assembly.) The optical axis 68 of the camera 62 may, but need not, coincide with an optical axis 70 of the projector 60. Typically, the optical axis 68 of the camera 62 will be directed at the center of the first display surface 50. However, this is not critical. Similarly, the optical axis 70 of the projector 60 will typically be directed at the center of the first display surface 50. However, this is not critical. The optical axes 68 and 70 may be approximately directed at a center of the first display surface 50.

The camera 62 may be used to capture one or more calibration images projected onto and through the first display surface 50 during a calibration process. A problem may arise when known calibration procedures are used in applications where it is desired to produce a projection of the source image that is the same size as the first display surface. When it is desired to project the source image onto the entire first display surface, it is necessary to map the topography of the entire display surface out to the outer edges or boundary 52 of the first display surface. Accordingly, the projected calibration image must cover the entire first display surface. However, when attempting to calibrate out to the outer edges of the first display surface, the projected calibration image may extend beyond the outer edges 52 of the display surface. If a projected calibration image extends beyond the outer boundary 52 of the first display surface, the entire calibration image will generally not be captured by the camera 62. If less than the entire calibration image is captured and if the calibration process requires that the entire calibration image be captured, the calibration process will not be performable.

This problem is particularly significant where the shape of the source image and the two-dimensional profile of the display surface (as seen from either the projection side or viewing side) are different. For example, the calibration image may have a rectangular two-dimensional profile while the display surface may have one or more curved boundaries, e.g., generally circular or elliptically shaped. The calibration image is typically rectangular because a rectangular calibration image requires less hardware to perform the mathematical operations needed in the calibration process than would be needed if the calibration image were non-rectangular. For instance, a non-rectangular calibration image would typically require hardware capable of evaluating square root and trigonometric functions. When a rectangular calibration image is projected onto a surface with an elliptical or other irregular outer boundary in a manner so that the projected calibration image covers the entire display surface, a portion of the projection will overlap and extend beyond the display surface. This problem may be further illustrated with reference to FIGS. 3A-D.

FIGS. 3A and 3B illustrate two examples of a rectangular calibration image, designated by reference numbers 72 and 74. These source calibration images each include a grid of regularly spaced "dots" 84, which are arranged in rows and columns. In an actual calibration image, the dots are projected points of light and the space between the dots is not illuminated. However, for purposes of illustration, the dots 84 are shown here in black on a white background as negative representations of the actual dots. (Throughout the drawings, the dots of calibration images and projected calibration images are depicted as negative representations for purposes of illustration.)

FIGS. 3C and 3D illustrate the calibration images 72 and 74 being projected onto two instances of the first display surface 50. Front views (from the viewing side) of the first display surface 50 are shown in the figures. Referring to FIG. 3C, it may be seen that the calibration image 72 when projected onto the first display surface 50 does not extend beyond the outer edges of the surface. In contrast, referring to FIG. 3D, when the calibration image 74 is projected onto the first display surface 50, the calibration image 74 overlaps and extends beyond the outer edges or boundary 52 of the surface.

Generally, the camera 62 will capture all dots that are projected onto and through the first display surface 50. However, the camera 62 generally will not capture dots that are not projected onto the first display surface 50.

If the calibration image 72 is used with a calibration process that requires capture of the entire calibration image, the calibration process will be performable because the entire calibration image will be captured. However, if the calibration image 72 is used, the calibration process will not determine the topography of the non-planar surface out to edges of the first display surface 50, e.g., topography will not be determined for the left-side region 76 or right side region 78.

Furthermore, topography will not be determined for similar regions (not labeled) located at the top and bottom of the first display surface 50. In the example shown in FIG. 3C, the calibration image 72 is inadequate for calibrating the projector 60 to project source images to the outer boundaries of the first display surface 50.

If the calibration image 74 is used with a calibration process that requires capture of the entire calibration image, it can be seen in the example shown in FIG. 3D that the projected calibration image 74 does not omit coverage of portions of the surface. However, if the calibration image 74 is used, the calibration image that will be captured will not include one or more projected dots. As one example, the projected dot 84' may not be captured. Because less than the entire projected calibration image 74 may be captured, a calibration process that requires capture of the entire calibration image would not be performable.

Figure 4:
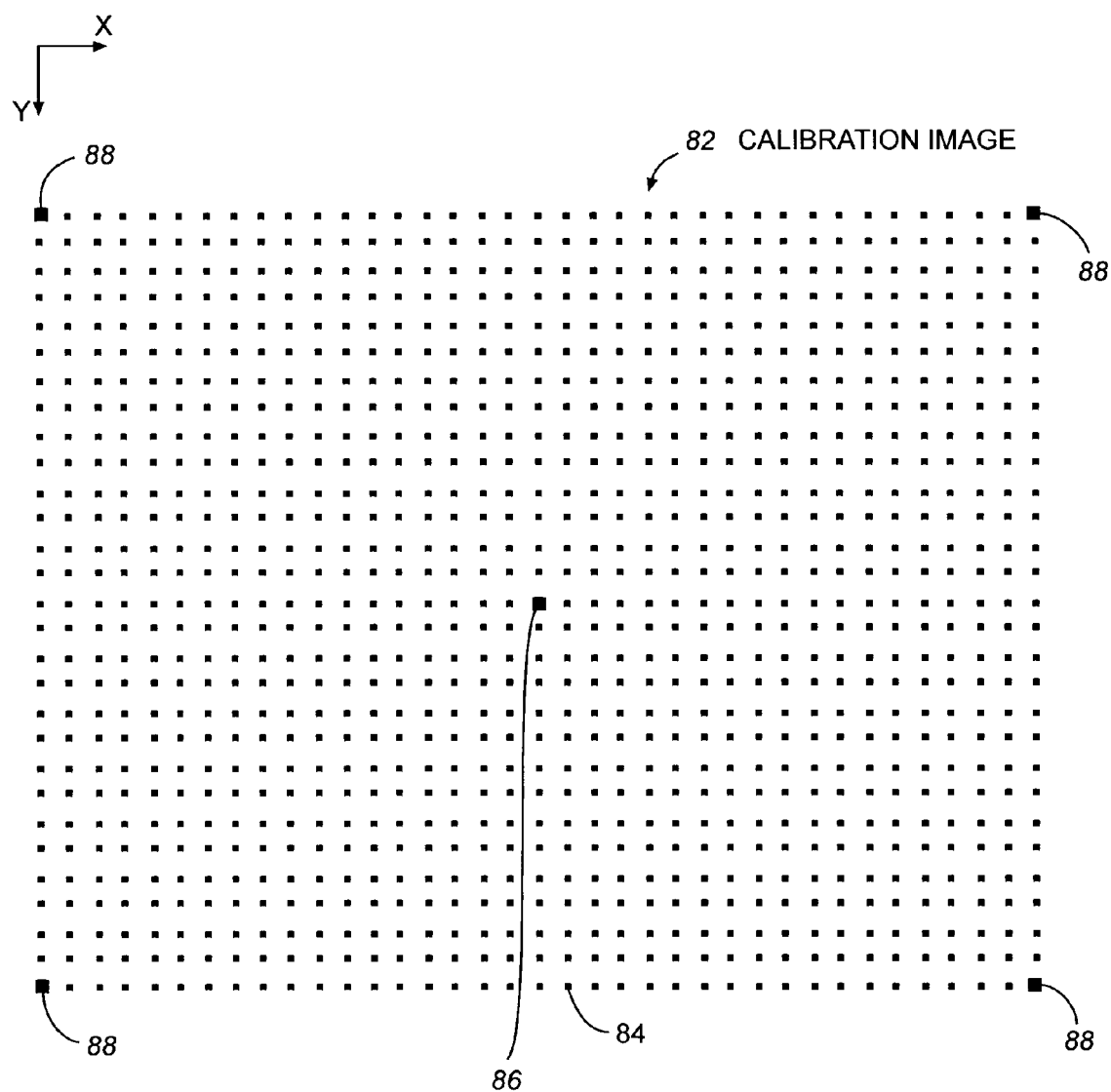
FIG. 4 illustrates scale points, a registration point, and a third example of a calibration image.

FIG. 4 shows another example of a calibration image 82. A calibration image may include any number of rows or columns. In one embodiment, a calibration image includes at least four dots. In one embodiment, a calibration image may include 31 rows and 46 columns. The calibration image 82 includes a larger number of rows and columns than the calibration images 72, 74 (shown in FIGS. 3A and 3B) in order to more closely correspond with the appearance of a typical calibration image. As will be explained below, each dot 84 of a calibration image may correspond with a calibration point. In addition, according to one embodiment, a calibration image may also include a registration point 86 and three or more scale points 88.

The registration point 86 and the scale points 88 may be part of the calibration image or may be superimposed on the calibration image. In either case, the dots 84, registration point 86, and scale points 88 have locations that are defined in a first coordinate space "A." Further, the dots 84 of the calibration image may have locations that are defined in a first coordinate space A. In this specification, a location in coordinate space A may be defined: (x, y). As one example, x may range from 0-639 and y may range from 0-479 in coordinate space A. In other words, coordinate locations in space A may include the pixel locations of a 640×480 image. It is not critical that coordinate space A correspond with only a 640×480 pixel image; any suitable range for x and y may be used. The registration point 86 and the scale points 88 may be part of an initial calibration image or may be added to the calibration image later in the calibration process. As explained below, the scale points 88 may be part of an initial calibration image, and the locations of the scale points 88 may be moved to locations other than those shown in FIG. 4. The locations of the scale points 88 shown in FIG. 4 may be initial locations for the scale points 88. In addition, as explained below, the registration point 86 may be added to the calibration image after the locations of the scale points 88 have been moved to new locations and their locations locked. The locations for the scale points 88 need not coincide with the location of a dot 84. The location for the registration point 86, however, preferably coincides with the location of one of the dots 84.

Figure 5:
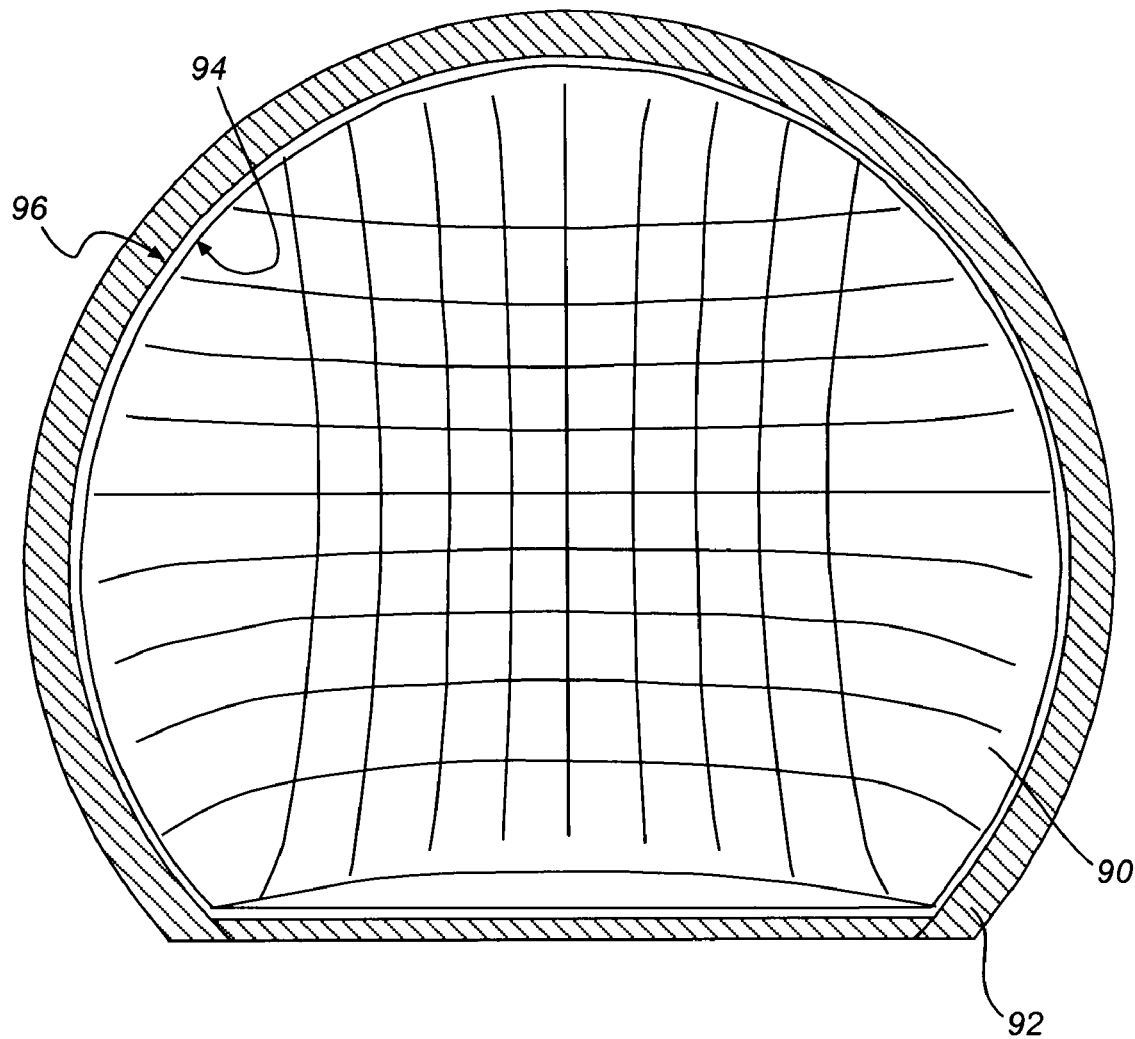
FIG. 5 illustrates a second example of a first display surface.

FIG. 5 shows a front view of a second example of a first display surface 90. FIG. 5 also shows a second display surface 92, having an inner boundary 96. The first display surface 90 and second display surface 92 may be made of the same material as first display surface 50, e.g., may be Plexiglas combined with or which is infused with a dye or pigment. With respect to FIG. 5, it is assumed that a user desires projecting one or more source images onto the first display surface 90. It is further assumed that the source images are to be projected out to an outer boundary 94 of the first display surface 90. The first display surface 90 may be non-planar, and may have a two-dimensional profile or boundary contour that is different from a calibration image, e.g., the calibration image may be rectangular. For example, the first display surface 90 may have a boundary contour that is circular shaped except for along the bottom, where it is linear. The first display surface 90 may have a side profile similar to that of first display surface 50, as shown in FIG. 1C. For example, the first display surface 90 may have a concave surface, somewhat similar to a hollow hemisphere, though having less curvature than a hemisphere.

Figure 6:
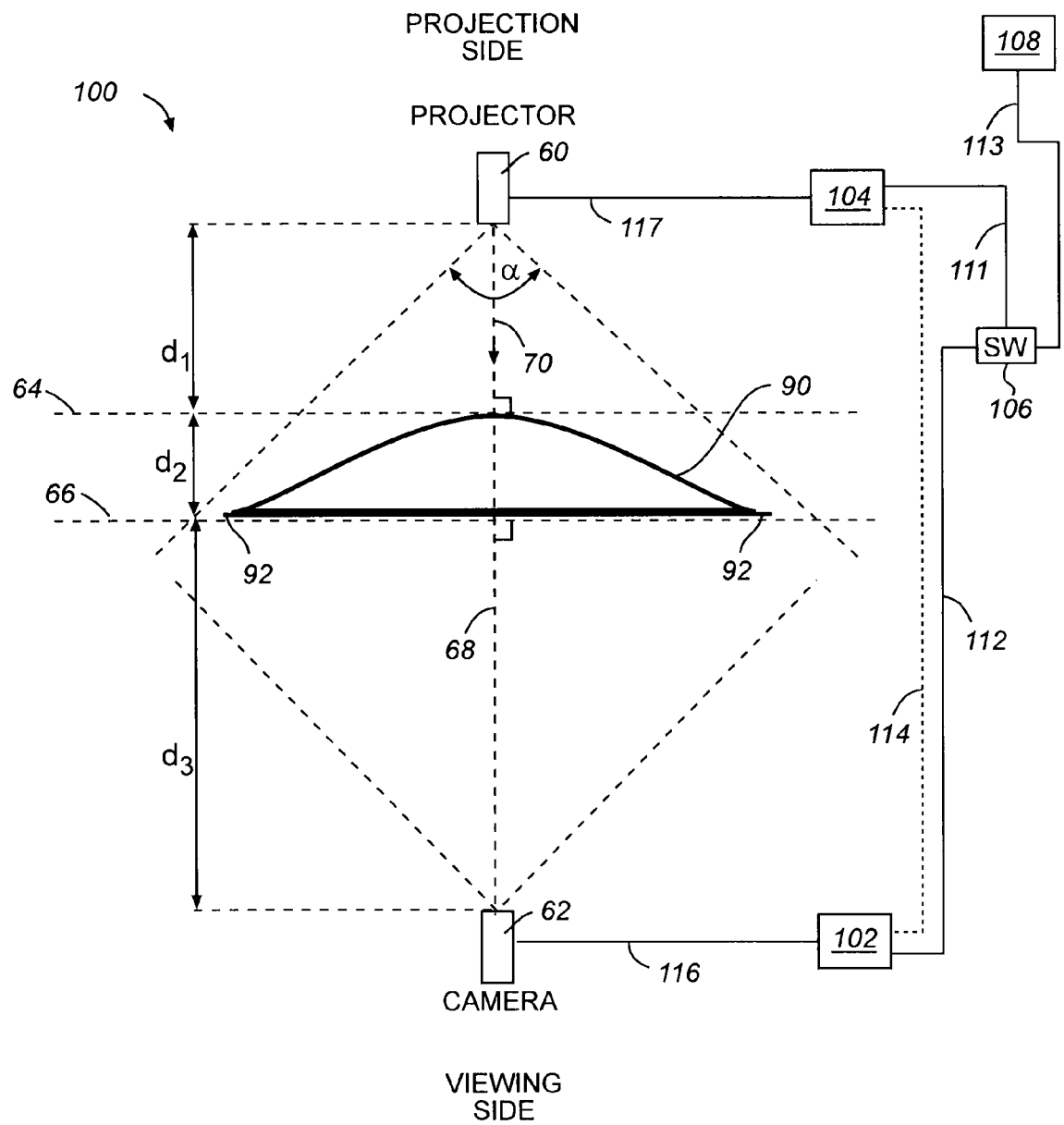
FIG. 6 illustrates a system including a first computer system, a second computer system, one or more second surfaces, the first display surface of FIG. 5, a projector, and an imaging device according to one embodiment.

FIG. 6 depicts a plan view of an arrangement of the first display surface 90 with respect to the projector 60 and the camera 62, which may be the same arrangement as that shown in FIG. 2. In FIG. 6, the first display surface 90 is shown in a cross-sectional view as cut along a line analogous to the line 4-4 of FIG. 1C. FIG. 6 shows a system 100 that may include a first computer system 102, a second computer system 104, one or more second surfaces 92, as well as the projector 60 and the camera 62. In addition, the system 100 may include a switch 106, an image source 108, and additional communication paths described below. The first computer system 102 may be coupled with the camera 62 and used in a calibration process. The second computer system 104 may be coupled with the projector 60 and used for generating both unmodified and warped images for projection.

In one embodiment, the projector 60 may be any conventional image projector that is capable of projecting an image. The projector 60 may include a liquid crystal display panel ("LCD") located in a light path, in which one or more LCD elements correspond with individual pixels, and the opening and closing of elements allows light to pass or be blocked. Alternatively, the projector 60 may include a digital micromirror device located in a light path, known in the art as digital light processing ("DLP"), wherein each mirror represents one or more pixels, and changing the orientation of a mirror allows light to be reflected toward or away from a display surface. As another example, the projector 60 may incorporate liquid crystal on silicon technology ("LCOS"). In addition, the projector 60 may include circuitry for interfacing with a computer or other device capable of providing an image. Further, the projector 60 may include a light source and may project a single beam of light. The projector 60 may include optical elements such as lenses for directing, polarizing, filtering, or focusing light.

The camera or imaging device 62 may be a digital camera or other conventional imaging device. The imaging device 62 may include an image sensor such as a charge-coupled device ("CCD") or a complementary metal-oxide semiconductor ("CMOS") sensor. The camera 62 preferably captures still images. In one embodiment, the camera 62 may capture video.

Figure 7:
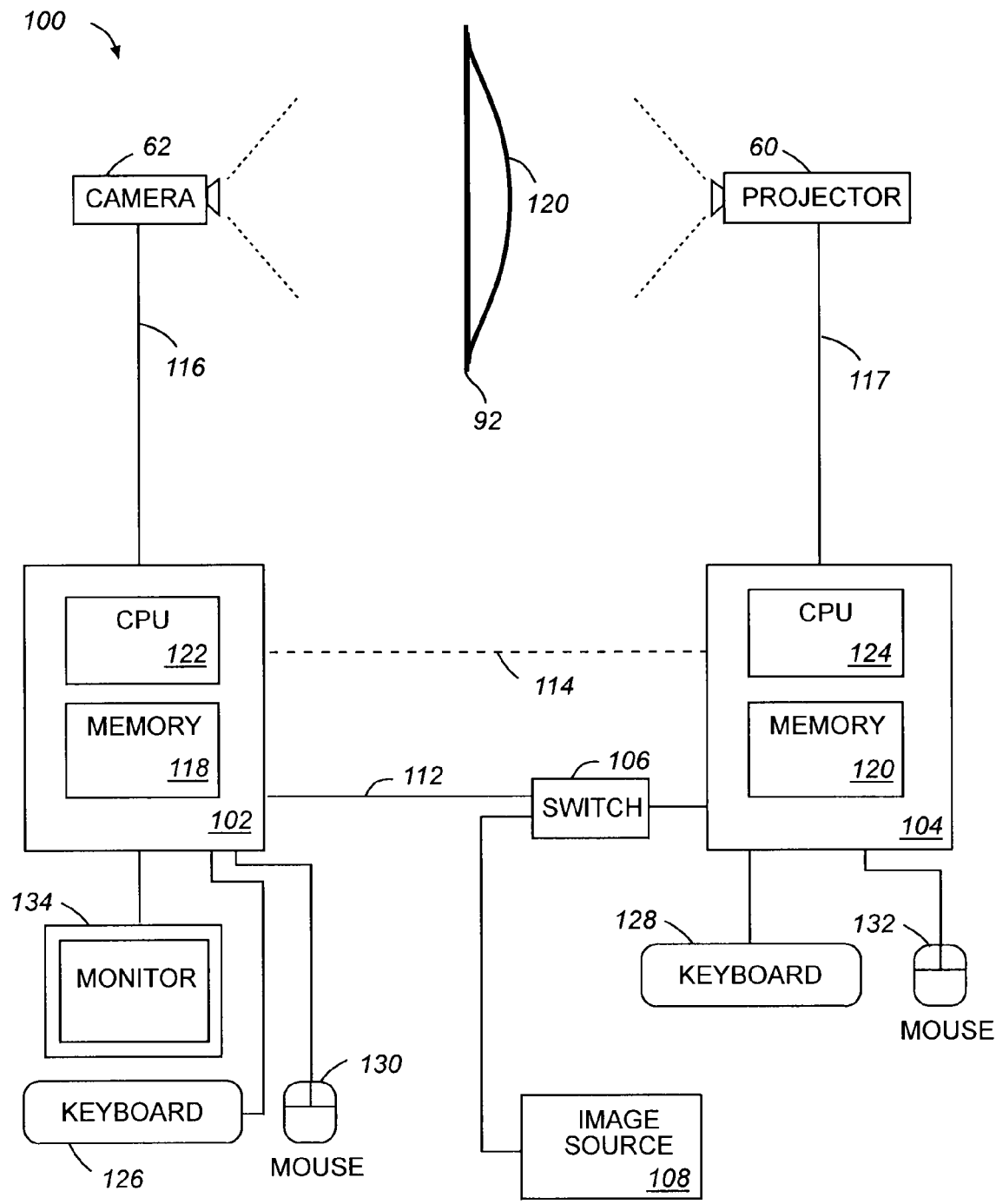
FIG. 7 illustrates first and second computer systems of FIG. 6.

The first and second systems 102, 104 shown in FIG. 5 are depicted in greater detail in FIG. 7. The first computer system 102 may include a memory 118, a processor 122, and one or more display devices or monitors 134. The first computer system 102 may also include input devices, such as a keyboard 126 and a mouse 130. Further, the first computer system 102 may include various components and devices, including memory and bus interface units, removable storage media units for use with flash drives, compact disks, and the like, a system clock, a power supply, and other components and devices known to one of ordinary skill in the art.

The second computer system 104 may include a memory 120 and a processor 124. The second computer system 104 may also include input devices, such as a keyboard 128 and a mouse 132. Additionally, the second computer system 104 may include a display device or monitor (not shown). Further, the second computer system 104 may include various components and devices, including memory and bus interface units, removable storage media units for use with flash drives, compact disks, and the like, a system clock, a power supply, and other components and devices known to one of ordinary skill in the art.

The memories 118 and 120 may be volatile or non-volatile (NV). For example, the memories 118 and 120 may be an SRAM, DRAM, or may include both an SRAM and a DRAM. Additionally, the memories 118 and 120 may include a Flash memory, an EEPROM, hard drive, or other NV media. The memories 118 and 120 may not be designed for easy removal. Alternatively, the memories 118 and 120 may be of the easily removable type, such as "SD Card," "Compact Flash," "Memory Stick" or other similar type. The memories 118 and 120 may be a combination of removable and non-removable types. The processors 122 and 124 may be conventional processors that are operable to execute a program of instructions stored in a memory. In one embodiment, one or both of the processors 122 and 124 may be a RISC processor, such as an ARM processor. Alternatively, one or both of the processors 122 and 124 may be one or more logic circuits operable to execute instructions or perform one or more operations described below. The processors 122 and 124 may include both a processor and one or more logic circuits. While the computer systems 102 and 104 may include the same or similar components, this is not critical.

It is not critical that the system 100 include two separate computer systems, i.e., the first and second computer systems 102, 104. In one embodiment, a single computer system may be used to perform all of the operations described below.

The first computer system 102 may be coupled with the camera 62 via a communications link 116. In addition, the first computer system 102 may be coupled with the second computer system 104 via the communications links 111 and 112, and the switch 106. The communications links 111, 112 may be used for transferring an image for projection from the first computer system 102 to the second computer system 104. In one embodiment, the second computer system 104 may also be coupled with the image source 108 via communications links 111, 113, and the switch 106. The image source 108 provides images for projection. The image source 108 may be any suitable source of images. The image source 108 may be capable of outputting a single image or, preferably, video images. For example, the image source 108 may be a personal computer, a DVD player or a video game console, such as a Sony PlayStation 3 or a Microsoft Xbox. The switch 106 allows a user to easily switch between coupling the second computer system 104 with the first computer system 102 and the image source 108. It is not critical, however, that second computer system 102 be coupled via the switch 106 with the first computer system 102 and the image source 108. Alternatively, the switch 106 may be omitted and a user may directly couple the system 102 with the system 104 to perform a calibration process, and the user may directly couple the system 102 with the image source 108 to perform an image projection process after the calibration process is complete. In addition, it is not critical that the switch 106 be a separate unit as shown. For instance, the switch 106 may be incorporated into the computer system 104. Moreover, the first computer system 102 may be coupled with the second computer system 104 via communications link 114. The communications link 114 may be used for transferring inverse offset table data from the first computer system 102 to the second computer system 104. It is not critical that inverse offset table data be transferred via communications link 114; any suitable method will suffice. For example, inverse offset table data may be stored on removable storage media, such as a flash stick or floppy disk, attached to first computer system 102. A user may remove the removable storage media containing the offset table data from the first computer system 102 and attach it to the second computer system 104. In one embodiment, the communications links 112, 116 may be a universal serial bus (USB), IEEE 1394 bus, or other suitable bus.

The second computer system 104 may be coupled with the projector 60 via a communications link 117. The second computer system 104 may have at least two modes of operation. In a first mode, the second system 104 may process a source image by applying an inverse-topographic function to pre-distort or warp the source image before outputting the source image to the projector 60. In the first mode, the second system 104 outputs distorted or warped images to the projector 60. In the second mode, the second system 104 does not warp the source image, but merely passes the source image through to the projector 60 without warping. The second system 104 may output a static image or, preferably, a sequence of images (i.e., video) to the projector 60.

Figure 8:
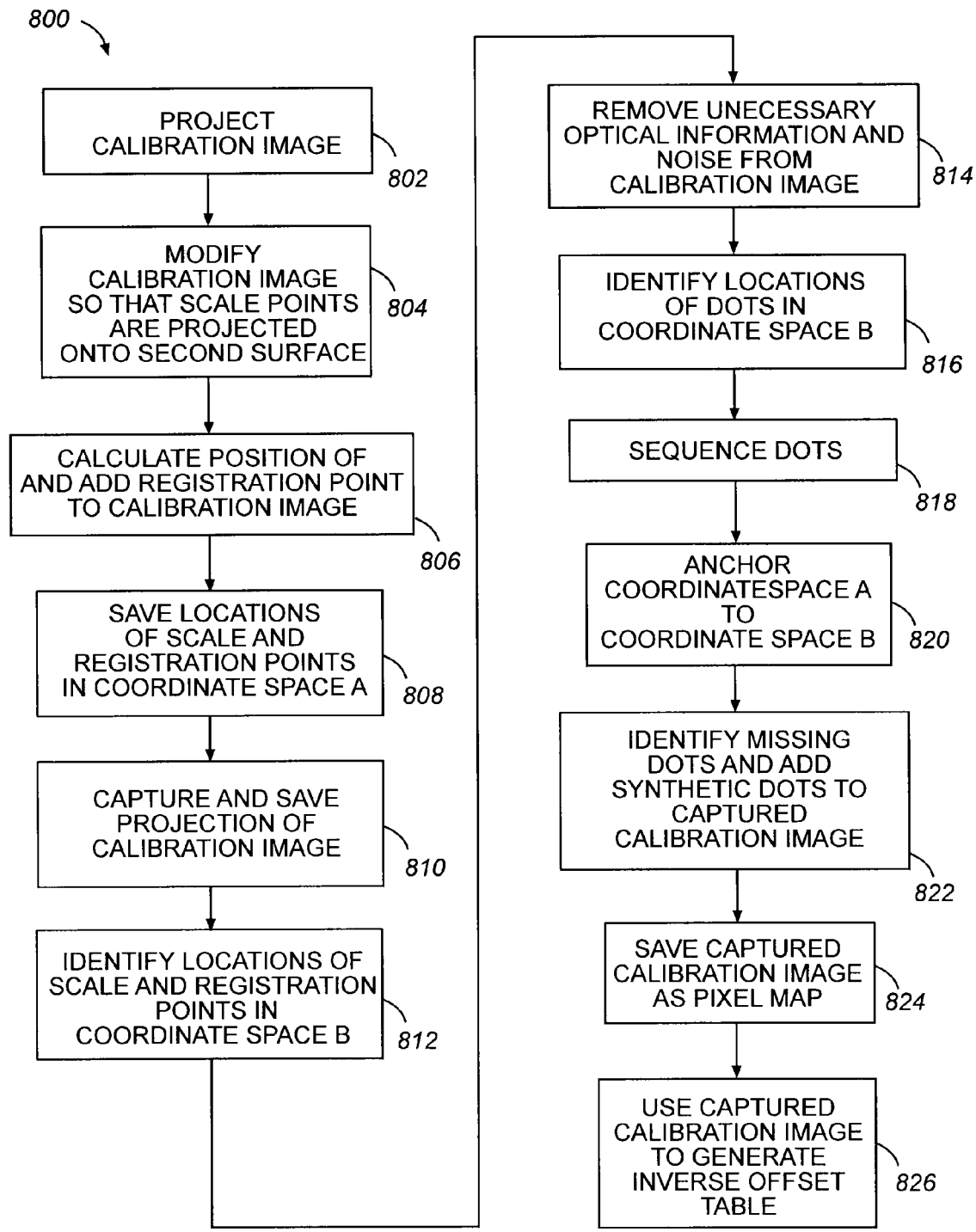
FIG. 8 illustrates a calibration process 800 that may be used to calibrate a projector according to one embodiment.

FIG. 8 illustrates a calibration process 800 that may be used to calibrate a projector according to one embodiment. The operations of the calibration process 800 may be performed in the order in which they are presented in the figure. However, it should be kept in mind that activities labeled as being included in a particular operation and the order in which the operations are presented is for purpose of illustrating the principles of the invention. Any of the activities labeled as being part of a particular operation may be combined with another operation or separated into a distinct operation as desired. Further, one of ordinary skill in the art will understand that the operations and activities shown in the figure or described below may be performed in any suitable order. Moreover, the operations and activities need not be performed sequentially; one of ordinary skill will understand that certain operations or activities may be performed in parallel.

In an operation 802, a calibration image is projected onto first and one or more second display surfaces. For example, in operation 802 the calibration image 82 shown in FIG. 4 is projected on to the first and second display surfaces 90, 92 shown in FIG. 5. In one embodiment, the calibration image includes four or more dots and three or more scale points. Initially, the calibration image 82 may be stored in memory 118 and the switch 106 set so as to couple the first and second computer systems 102, 104. The operation 802 may include transferring the calibration image 82 from the first computer system 102 to the computer system 104 via communications links 111, 112. Preferably, the calibration image 82 is transferred to the projector 60 as a video signal, i.e., the calibration image is repeatedly transferred at a frame rate required by the projector or display device.

In one embodiment, the first computer system 102 is coupled with a second display device (not shown). In this embodiment, the projected calibration image is rendered on the second display device as well as being projected onto the first and second display surfaces.

Once the calibration image has been projected, an operation 804 may be performed. The memory 118 of the first computer system 102 may store calibration software. In operation 804, this calibration software may be invoked. Among other functions, the calibration software enables a user to reposition one or more of the scale points 88. In operation 804, the locations of the scale points 88 in the first coordinate space A may be changed so that the scale points are projected onto one or more second surfaces. The reason that the locations of scale points are changed is because it is desirable to have the scale points 88 projected onto the second surface 92, and typically, the locations where the scale points are initially projected are not on the second surface 92. However, sometimes the scale points may initially be projected onto the second surface 92. In this case, the operation 804 may be optional.

Figure 9:
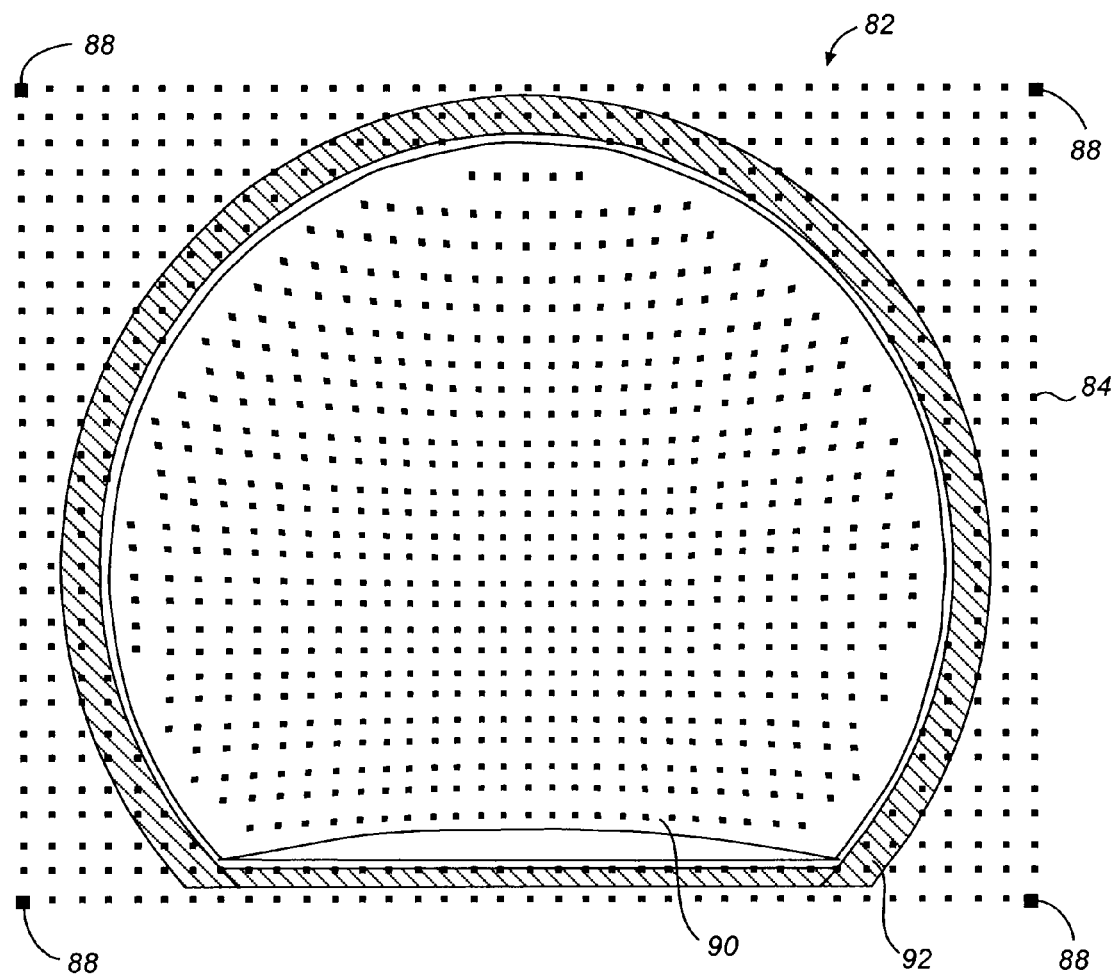
FIG. 9 illustrates one example where the scale points of FIG. 4 are not projected onto the second surface of FIG. 6.
Figure 10:
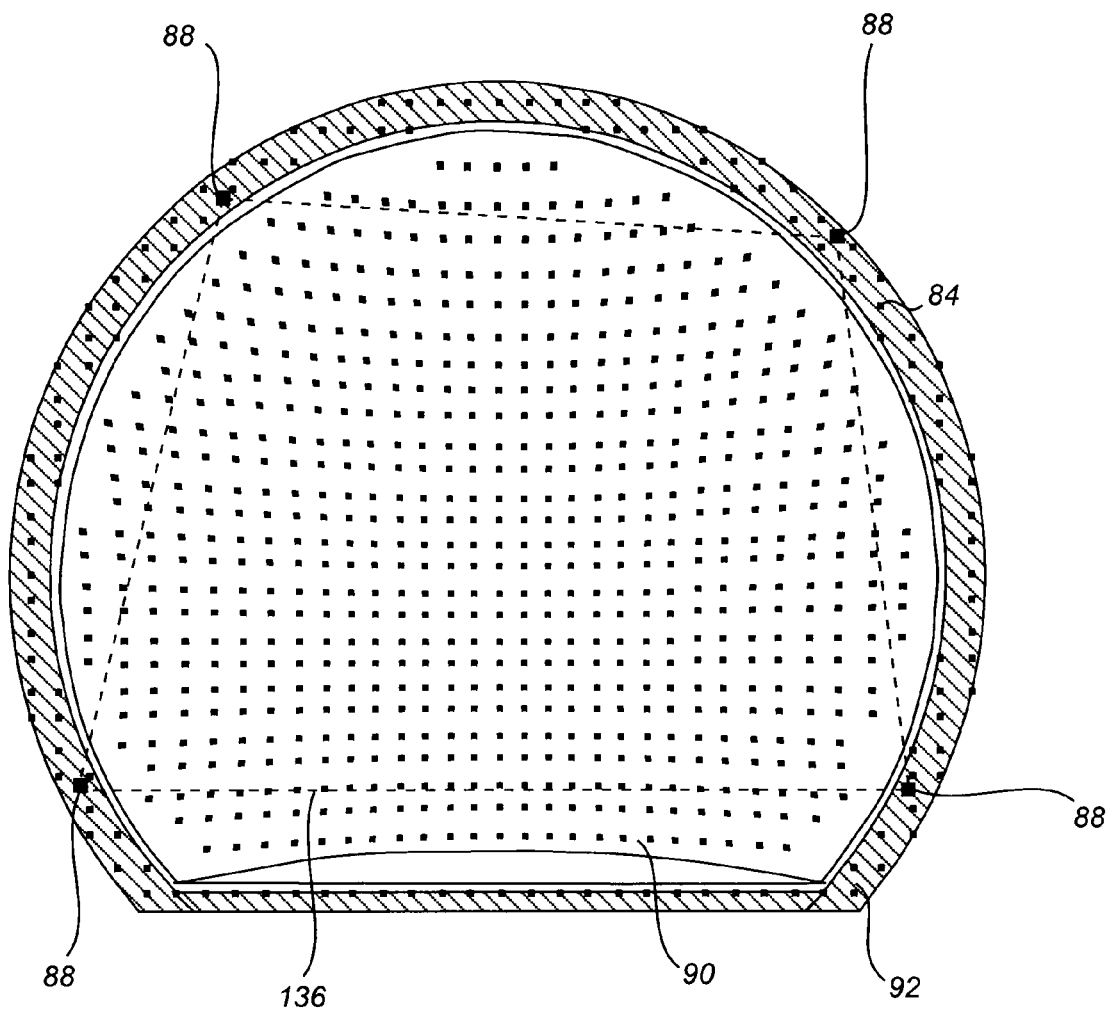
FIG. 10 illustrates one example of the scale points of FIG. 4 being projected onto the second surface of FIG. 6.

FIG. 9 illustrates one example where scale points 88 are not projected onto the second surface 92. FIG. 9 shows a portion of the calibration image 82 superimposed on the first and second display surfaces 90, 92 at or near the imaginary projection plane 66. (The calibration image 82 is superimposed for purposes of illustration, but in practice portions of the calibration image not projected onto the display surfaces would not ordinarily be seen when viewing the display surfaces from the viewing side.) As can be seen in FIG. 9, the scale points 88 are not projected onto the second surface 92. In addition, FIG. 9 shows the displacement of calibration points impinging on the first display surface 90 from their relative positions in the calibration image due to the non-planar nature of the surface. FIG. 10 shows example locations for the scale points 88 after the points have been moved by a user. FIG. 10 is similar to FIG. 9 except that it shows the scale points 88 being projected onto the second display surface 92, and does not show the portion of the calibration image 82 superimposed on the first and second display surfaces 90, 92.

In the operation 804, new locations in the calibration image for the scale points 88 may be selected by a user. The user may move a scale point 88 by moving the pointing device 130, or by manipulating another input device. As the user moves a scale point 88, the calibration image 82 (or a copy) stored in memory 118 may be modified to reflect the new scale point location. Because the calibration image may be output to the second computer system as a video signal, movement of a scale point may be seen in real time. The user may monitor movement of a scale point by viewing the image projected onto the first and second display surfaces 90, 92, or by viewing the second display device, or by viewing both devices. Preferably, the user selects locations for the scale points 88 such that a polygon formed by connecting the points encloses substantially all of the first display surface 90 (as seen in two dimensions from a viewpoint, such as from the imaging device 62). To assist the user, a polygon 136 connecting the scale points may be superimposed on the calibration image 82, however, this is not essential. In one embodiment, the calibration image 82 includes three scale points 88, which are repositioned onto the second display surface 92 to form a triangle that encloses substantially all of the first display surface 90. In another embodiment, the calibration image includes four scale points 88, which are repositioned onto the second display surface 92 to form a rectangle that encloses substantially all of the first display surface 90. In alternative embodiments, the calibration image may include five or more scale points that are repositioned onto the second display surface 92. It is not critical that the polygon formed by the projected scale points 88 enclose the entire first display surface 90. In addition, it should be noted that the user preferably selects the new locations for the projected scale points 88 so that they define a first projection plane that is exactly or approximately normal to the axis 70 of projection. Alternatively, the user may select the new locations for the projected scale points 88 so that they define a first projection plane that is exactly or approximately normal to the optical axis 68 of the camera. (One of ordinary skill in the art will understand that "approximately" normal, stated in terms of degrees, typically may mean within between 1-15 degrees of 90 degrees, depending on distances involved in a particular assembly.) In this regard, the user may adjust the positioning of the second display surface 92 rather than repositioning one or more scale points 88. If the second display surface 92 is a single or integral surface, it is preferably substantially planar.

In an operation 806, when the user is satisfied with the new locations for the scale points 88, the user issues one or more commands to the calibration software that fixes or locks the scale points 88 at their new location. The user may lock a scale point 88 by manipulating a control on the pointing device 134, e.g. right-clicking. In response to the lock command, the calibration software calculates an (x, y) coordinate location for the registration point 86 in the first coordinate space A. The calibration software calculates the coordinate location using an algorithm that places the location substantially at the center of first coordinate space A, such as by dividing the pixel dimensions of the space by two. For example, if first coordinate space A is 640 pixels wide and 480 pixels high, the registration point 86 may be assigned a coordinate location of (320, 240). It is preferred that the calculated location coincide with the location of one of the dots 84 of the calibration image. However, the algorithm may calculate a location at the center of first coordinate space A that does not coincide with the location of a dot. In this case, the algorithm modifies the calculated location so that it coincides with the location of a dot 84 near to the calculated center location. The algorithm may employ a priority scheme for picking a nearest dot when two or more dots are equidistant from the calculated location. For example, when the calculated location is equidistant between two dots above or below, the dot above may be selected. In addition, when the calculated location is equidistant between two dots on either side, the dot to the left may be selected. In one embodiment, the algorithm for calculating a center coordinate location takes into account the locations of the locked locations of the scale points 88, so that the registration point location is centered in the polygon 136. Moreover, the calibration image may be modified so that the registration point 86 is added to the image at the calculated location. When the modified calibration image is output to the projector 60, the registration point 86 may be seen in the projected image.

In an operation 808, the (x, y) coordinate location of each scale point 88 in the first coordinate space A is stored in memory 118. In addition, the (x, y) coordinate location of the registration point 86 in the first coordinate space A is stored in memory 118. The coordinate locations of the scale points 88 and the registration point 86 saved in operation 808 may be saved as meta data that is associated with a captured calibration image (see operation 810). Alternatively, the coordinate locations of the scale points 88 and the registration point 86 saved in operation 808 may be saved separately from the captured calibration image.

In an operation 810, the projected calibration image is captured and stored in the memory 118. The projected calibration image may be captured with the camera 62. The captured calibration image may be saved as an array of pixels corresponding with the captured image, i.e., as a pixel map. The pixels in the captured image have locations that are defined in a second coordinate space "B." Accordingly, because they are part of the captured image, the captured dots 84, captured scale points 88, and captured registration point 86 have locations that are defined in the second coordinate space B. In this specification, a location in coordinate space B may be defined: (u, v). As one example, u may range from 0-3000 and v may range from 0-2000 in coordinate space B. In other words, coordinate locations in space B may include the pixel locations of a 3000×2000 image. It is not critical that coordinate space B correspond with only a 3000×2000 pixel image; any suitable range for u and v may be used.

Once the projected calibration image has been captured and saved as a pixel map, an operation 812 may be performed. The memory 118 of the first computer system 102 may store editing software. In operation 812, this editing software may be invoked. Among other functions, the editing software enables a user to display and edit the captured calibration image on the display device 134. In practice, the editing software is typically used to display and edit a copy of the captured calibration image stored in the memory 118. In the operation 812, the user displays the captured calibration image on the monitor 134 and identifies to the software the coordinate locations of all of the captured scale points in the captured image in coordinate space B. The user may identify a scale point 88 by moving the pointing device 130, or by manipulating another input device, so that an arrow or other icon is positioned over the scale point. As the user moves the pointing device 130, the (u, v) coordinate location is tracked. When the arrow is over the scale point 88, the user may click a pointing device button to store the (u, v) coordinate location in memory 118. In addition, the user may identify and save the (u, v) location of the captured registration point in coordinate space B in the same manner used for the captured scale points.

In an alternative embodiment, the (u, v) coordinate locations of the captured scale points 88 and the captured registration point 86 may be identified using an algorithm, implemented in software associated with the editing software, for recognition of two-dimensional objects. The object recognition algorithm may differentiate the captured scale points 88 and registration point 86 from other objects in the captured calibration image based on their shape, size, intensity, or color. As one of ordinary skill in the art will appreciate, an object recognition algorithm for differentiating points may employ various known techniques, such as the applying filters to the image for eliminating noise and increasing contrast.

Upon saving the coordinate locations of the captured scale points 88 and captured registration point 86 in coordinate space B, the operation 812 may include calculating coordinate locations for and displaying reference points indicating the extent of the calibration image in the first coordinate space B. These reference points correspond with predicted locations for corners of the calibration image in the coordinate space B. As one example, the predicted locations of four reference points may be near to the initial locations of the four scale points shown in FIG. 4, however, the reference points may be represented in a different color, shape, or size than the four scale points. The reference points may be superimposed on the captured calibration image 82 and rendered on the display device 134 for the purpose of providing the user with visual feedback. It is not critical, however, that the reference points indicating the extent of the calibration image be predicted and rendered.

A projective mapping technique may be used to calculate the coordinate locations of the reference points indicating the extent of the calibration image 82 in the second coordinate space B. The projective mapping technique includes creating a transformation matrix. The transformation matrix is based on the respective known locations of the four scale points 88 in the first and second coordinate spaces A and B. The transformation matrix is an alternative method for expressing the coefficients in the projective mapping equations below:

$$x = \frac{a_{11}u + a_{21}v + a_{31}}{a_{13}u + a_{23}v + a_{33}}$$

$$y = \frac{a_{12}u + a_{22}v + a_{32}}{a_{13}u + a_{23}v + a_{33}}$$

where the transformation (or mapping) matrix is:

$$M = \begin{vmatrix} a_{11} & a_{12} & a_{13} \\ a_{21} & a_{22} & a_{23} \\ a_{31} & a_{32} & a_{33} \end{vmatrix}$$

See "Digital Image Warping", George Wolberg, IEEE Society Press Monograph, 1990. A projective mapping has eight degrees of freedom and the terms of the matrix may generally be determined by solving eight equations having eight unknowns using standard methods. However in the case of mapping a unit square to a quadrilateral, the eight equations may be simplified and reduced to the following six equations:

$$a_{11} = x_1 - x_0 + a_{13}x_1$$

$$a_{21} = x_3 - x_0 + a_{23}x_1$$

$$a_{31} = x_0$$

$$a_{12} = y_1 - y_0 + a_{13}y_1$$

$$a_{22} = y_3 - y_0 + a_{23}y_1$$

$$a_{32} = y_0$$

An inverse matrix $M^{-1}$ defines a mapping from a quadrilateral to a unit square. The mapping may be generalized to map a rectangle to a quadrilateral by pre-multiplying with a scale and translation matrix.

For purposes of the present embodiments, a quadrilateral to quadrilateral mapping is generally desired. Calculation of the quadrilateral to quadrilateral mapping may be made more efficient, however, by breaking the calculation into stages, and using the simplification described in the preceding paragraph. In practice, a quadrilateral-to-quadrilateral mapping may be produced by composing square-to-quadrilateral and quadrilateral-to-square mappings, or rectangle-to-quadrilateral and quadrilateral-to-rectangle mappings. See Projective Mappings for Image Warping, Paul Heckbert, excerpted from Fundamentals of Texture Mapping and Image Warping, Paul Heckbert, Master's Thesis, UCB/CSD 89/516, CS Division, U.C. Berkeley, June 1989.

Once the transformation matrix is known, the coordinate locations of the four corner points (verticies) of a quadrilateral in the second coordinate space B may be calculated using the known coordinate locations of the corresponding corner points in the first coordinate space A. Similarly, once an inverse of the transformation matrix is known, coordinate locations of the four corner points of a quadrilateral in the first coordinate space A may be calculated. Thus, the coordinate locations of the four reference points indicating the extent of the calibration image 82 in the second coordinate space B may be calculated using the coordinate locations of four points corresponding with the extent of the calibration image 82 in the first coordinate space A. This calculation uses the equations given above, where the coefficients of the equations are given by the transformation matrix. The transformation matrix calculation uses the respective known locations of the four scale points 88 in the first and second coordinate spaces A and B.

In an operation 814, unnecessary optical information and optical noise may be removed from the captured calibration image. In one embodiment, a mask line 137 may be manually defined according to instructions received from a user via one or more input devices, such as the keyboard 126, mouse 130, or other suitable input device. The editing software receives the user's instructions and overlays the mask line 137 on the copy of the captured calibration image stored in the memory 118. The overlain mask line 137 and the captured image may be rendered on the display device 134. The user may monitor the tracing of the mask line 137 by viewing the image projected onto the first and second display surfaces 90, 92, or by viewing the second display device, or by viewing both devices.

Figure 11:
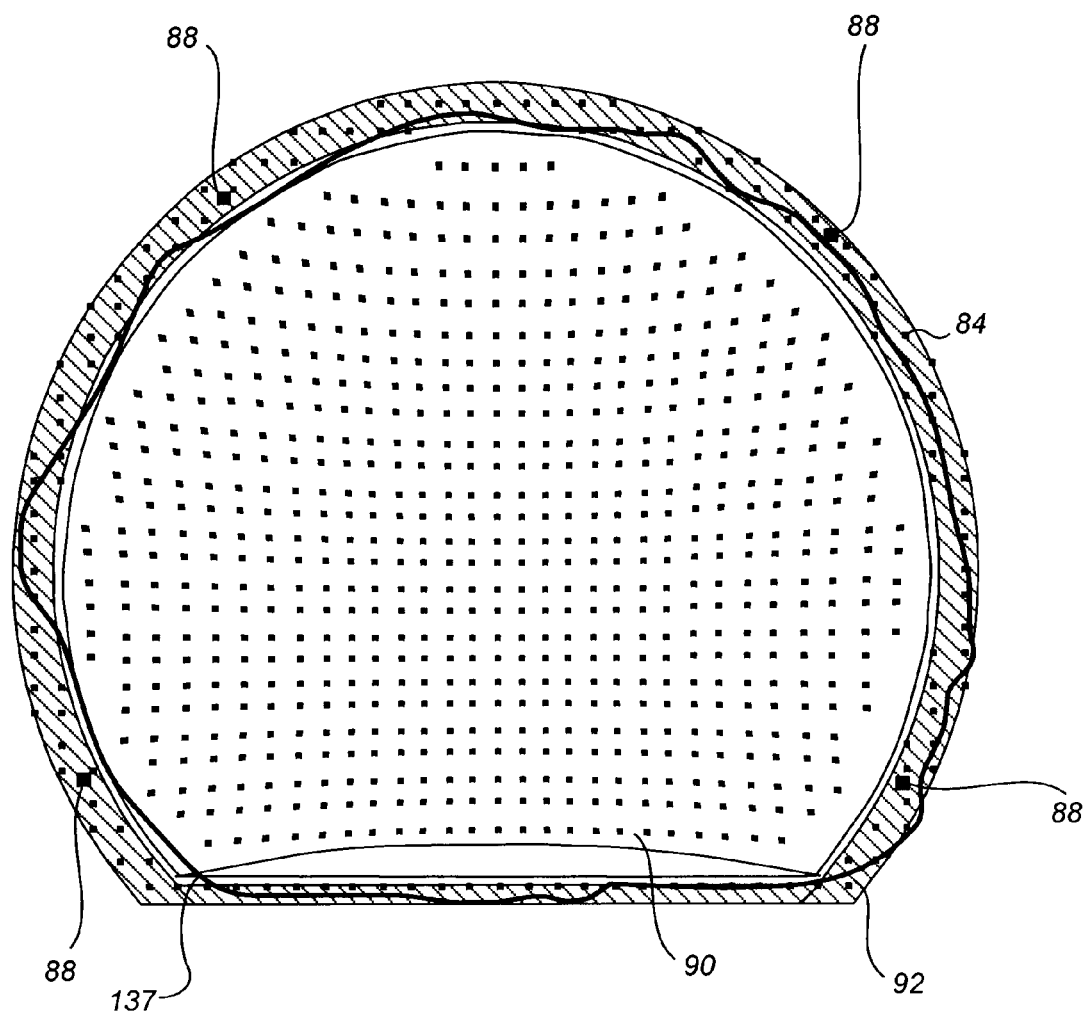
FIG. 11 illustrates one example of a mask line.
Figure 12:
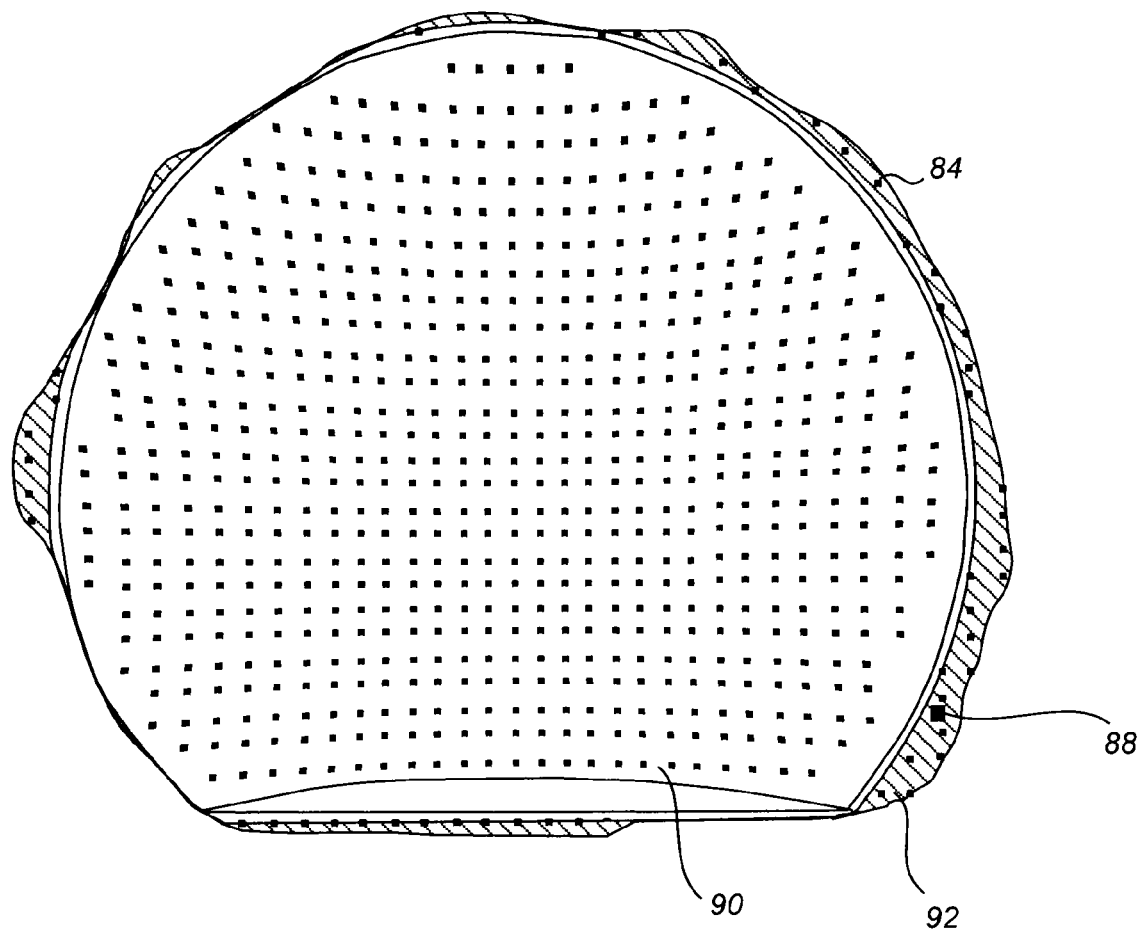
FIG. 12 illustrates one example of an image that may be displayed on a display device after an exemplary masking operation.

FIG. 11 illustrates one example of a mask line 137 drawn using a lasso tool. Another example of the mask line 137 is a polyline (not shown) in which user selected points are connected with straight line segments to form a polygon. In one embodiment, the mask line 137 may be defined by an automated or software-implemented process, such as an edge-detecting process. The mask line 137 forms a closed area. The user may draw a mask line 137 that roughly follows the contour of the outer boundary 94 of the first display surface 90, as shown in FIG. 11. It is not critical that the mask line precisely follow the outer boundary 94, although the mask line 137 should include all dots projected onto the first display surface 90. Once a user has defined a mask line 137, the entire part of the captured image not within the mask line may be masked. The editing software may identify pixels having coordinates outside of the closed area and may replace identified pixels with pixels having a particular value, e.g., black. After masking, the copy of the calibration image stored in memory 118 includes only that part of the image captured by the camera that is within the mask line 137. FIG. 12 illustrates one example of an image that may be displayed on the display device 134 after an exemplary masking operation.

As can be seen from the example shown in FIG. 12, the masking operation may not eliminate all unnecessary information and optical noise. The editing software may provide one or more additional tools for manually deleting unnecessary information and optical noise remaining after a masking operation. For example, editing software may include a tool that allows a small icon to be positioned over the captured calibration image. The icon may be positioned based on user input instructions received from the keyboard 126, mouse 130, or other suitable input device. When the icon is positioned in a desired location, the user may issue an "erase" instruction that causes pixels having coordinates within a predefined area surrounding the location of the icon to be replaced with pixels having a particular value, e.g., black. The predefined area may be a rectangular or circular. The predefined area may be a 50×50 pixel rectangle as one example. In addition, the editing software may include other tools for selecting pixels and causing the selected pixels to be replaced with pixels having a particular value, e.g., black.

Figure 13:
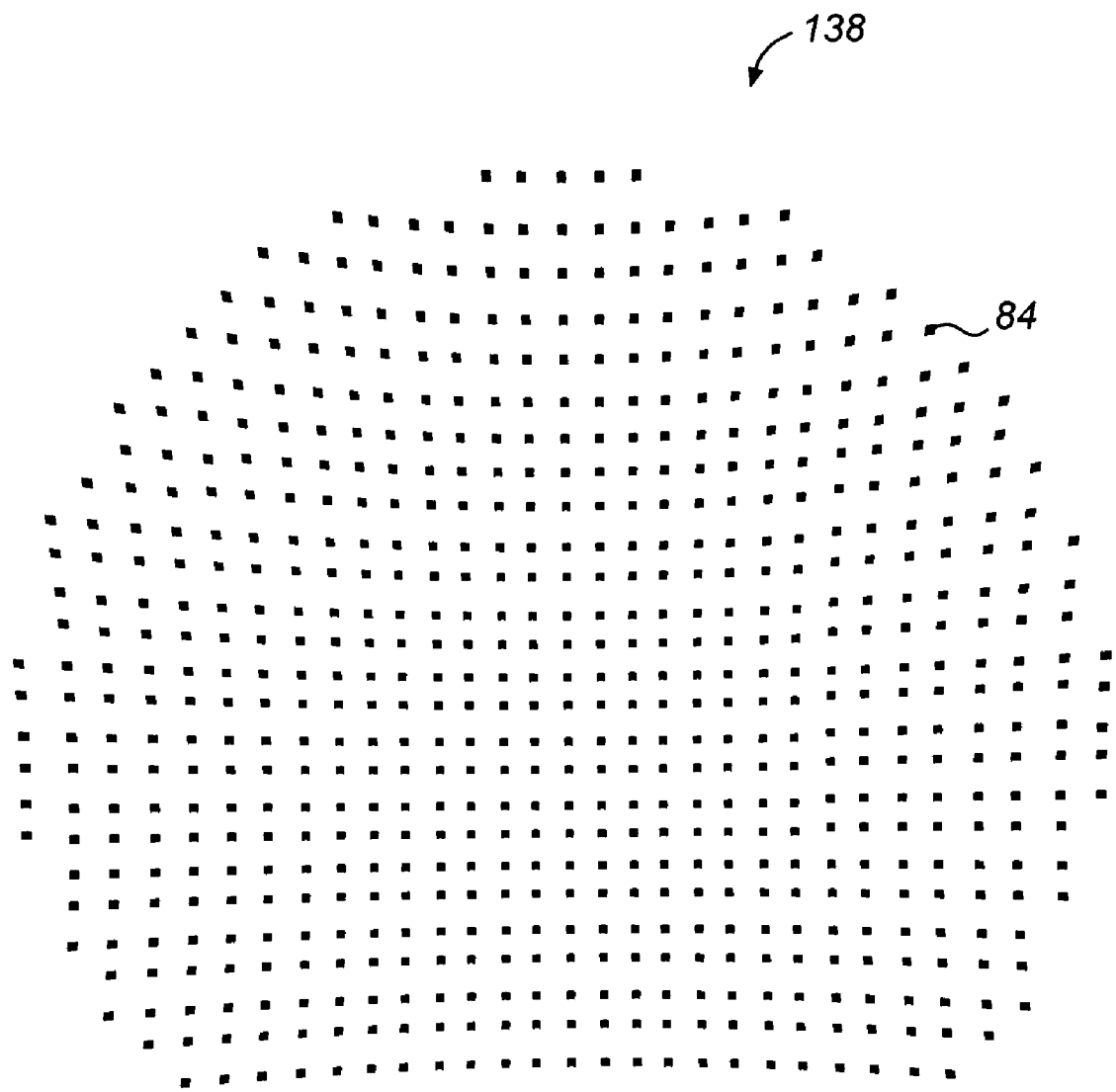
FIG. 13 illustrates one example of an image that may be displayed on a display device after unnecessary information and optical noise have been deleted.

The additional tools provided in the editing software for manually deleting unnecessary information and optical noise remaining after a masking operation may be used to replace selected pixels that are located: (a) outside (or off) of the first display surface 90; or (b) within (or on) the first display surface 90. As an example of the later, the tools may be used to remove reflective glare on the first display surface 90. When the additional tools are used, it is preferable that the user take care not to replace pixels defining a dot of the projected calibration image. FIG. 13 illustrates one example of an image 138 that may be displayed on the display device 134 after unnecessary information and optical noise have been deleted. The image 138 shown in FIG. 13 corresponds with the copy of the captured calibration image stored in memory 118 after unnecessary information and optical noise have been deleted. The image 138 shown in FIG. 13 includes all of the dots 84 of the calibration image that were projected onto the first display surface 90.

In one alternative embodiment, unnecessary information and optical noise, including unnecessary information eliminated in a masking operation, may be detected and deleted using known object recognition techniques. For example, a known edge detection technique may be used to recognize the outer edge of boundary 94 of the first display surface 90. One of ordinary skill in the art will appreciate that various known techniques may be employed, such as the applying a mask to a portion of the captured image outside edge boundary 94 and various noise-removing and other filters to a portion of the captured image inside the edge boundary 94.

An operation 816 identifies locations of captured dots 84 of the captured calibration image in the second coordinate space B. Because unnecessary information and optical noise may have been eliminated by the time this operation is performed, the operation 816 may only identify locations of captured dots 84 of the captured calibration image that were projected onto the first display surface 90. Each captured dot 84 of the captured calibration image is made up of a cluster of pixels. The operation 816 may include a scanning of the captured calibration image by the editing software for the purpose of identifying clusters of pixels having a luminance above a particular threshold. The threshold may be user defined. When the editing software identifies a cluster of pixels, the cluster may be deemed to be a dot 84 of the captured calibration image. In addition, the editing software may determine the center point of each cluster of pixels. The scanning of the captured calibration image and the determining of the center points may be accomplished in the manner described in our co-pending application App. '180, referenced above. The editing software may save the (u, v) location in the second coordinate space B of each center point in the memory 118.

The operation 816 may include modifying the appearance of each dot 84 of the captured calibration image. Modifications may include increasing the contrast of the dots with respect to other features in the captured calibration image. In addition, modifications may include sharpening the focus of the dots 84. The cluster of pixels representing a dot may blend at the edges with other features in the captured calibration image. Sharpening replaces blending in a transition region with pixels that are either part of the cluster or not part of the cluster, thereby clearly demarking the boundary of the cluster.

After identifying and sharpening the appearance of dots 84, the captured calibration image displayed on the display device 134 may be inspected. If inspection indicates a need, the user may change the threshold and repeat operation 816. This provides the advantage of allowing calibration to be performed at a level of ambient light somewhat higher than is found in a darkened room.

Additionally, the operation 816 may include increasing the contrast in the captured calibration image. To increase contrast, the editing software may scan pixels of the captured image in raster (or some other) order. If a scanned pixel is below a threshold, the pixel is replaced with a pixel having a first particular value, e.g., black. On the other hand, if a scanned pixel is above the threshold, the pixel is replaced with a pixel having a second particular value, e.g., white.

Figure 14A:
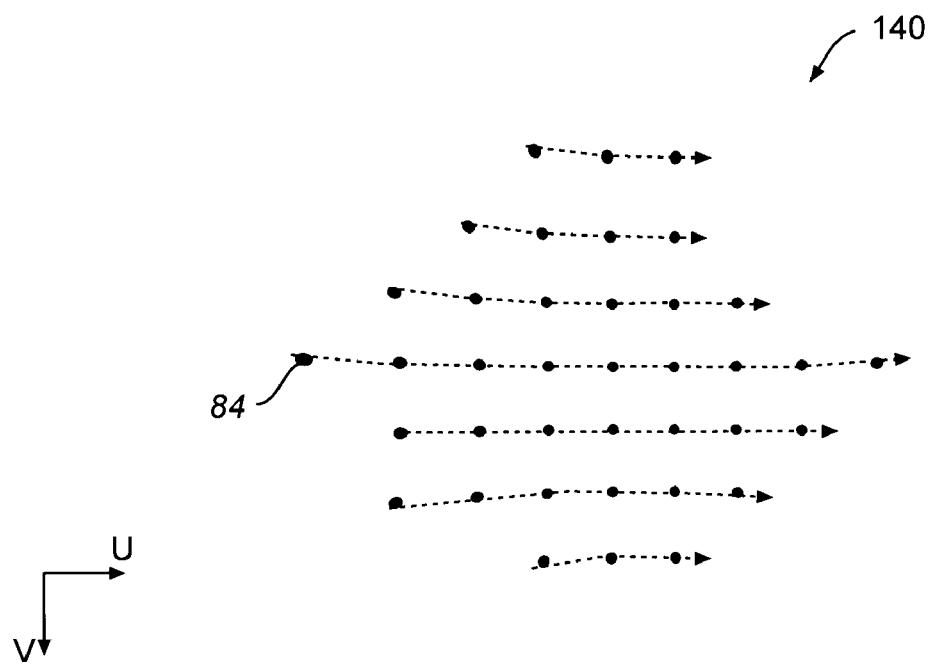
FIG. 14A illustrates an alternative example of a captured calibration image and a sequencing operation.
Figure 14B:
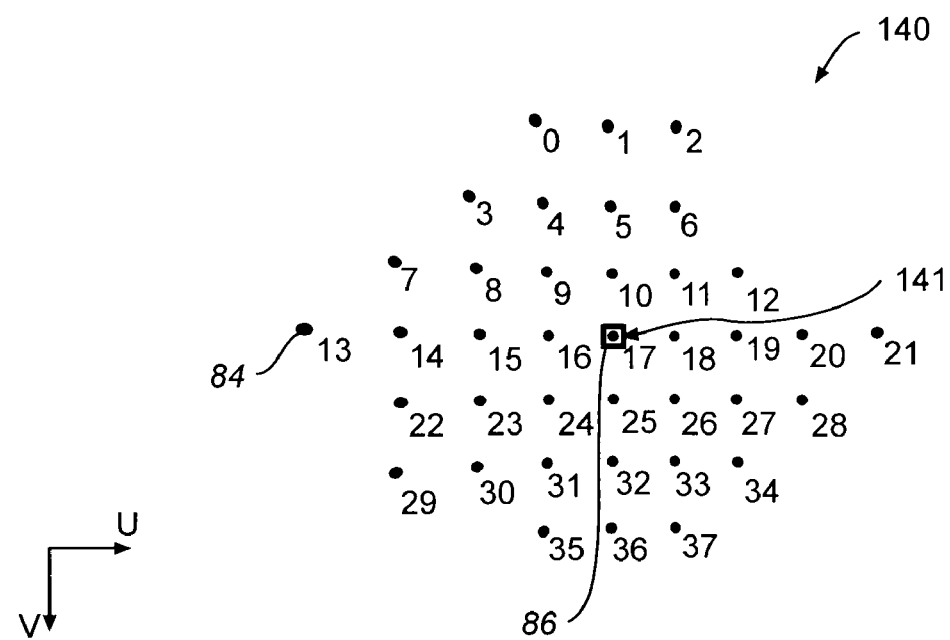
FIG. 14B illustrates the alternative captured calibration image of FIG. 14A and sequence numbers assigned in a sequencing operation.

In an operation 818, the dots 84 may be sequenced or assigned a particular order. FIGS. 14A and 14B illustrate the sequencing operation 818. For simplicity of illustration, the captured calibration image shown in FIGS. 14A and 14B differs from the captured calibration image shown in FIG. 13. FIGS. 14A and 14B show an image 140 having dots 84 of a captured calibration image after unnecessary information and optical noise have been deleted and after the locations of the dots 84 have been identified. In addition, the dots 84 of the image 140 may have had their appearance modified as described above. Further, in FIG. 14B, the registration point 86 is shown for illustrative purposes as a rectangle so as not to obscure the dot 84 which shares the same location. The captured calibration image shown in FIGS. 14A and 14B corresponds with an exemplary calibration image 142 shown in FIG. 15.

In operation 818, the editing software may provide a tool that allows an icon to be sequentially positioned over the dots 84. The positioning of the icon may be based on user input instructions received from the keyboard 126, mouse 130, or other suitable input device. Positioning the icon over one of the dots 84 allows a user to select the dot. The editing software sequences dots in the order in which they are selected. It is not necessary for the user to precisely point out (or roll over) a dot to select it; the user need only move the mouse closer to the desired dot than to any other dot. In operation 818, the user may select the left-most dot in the top row and proceed to select additional dots in the row by moving the icon from left to right. The user may repeatedly select rows of dots in this manner, proceeding from the top row to the bottom row. FIG. 14B shows one example of the sequence numbers assigned by the editing software after the operation 818 is complete. The sequence numbers for each dot may be stored in memory along with the (u, v) coordinates of the dot. In addition, the dot's row number may be stored. Sequence numbers and row numbers may be stored as meta data with the captured calibration image or in a separate file. In one alternative embodiment, the editing software automatically sequences the dots 84 without the need for a user to manually position an icon over individual dots 84.

In an operation 820, the registration point 86 may be used to anchor the second coordinate space B to the first coordinate space A. The operation 820 may include locating a dot 84 in the captured calibration image that is closest to the registration point 86. In addition, operation 820 may include locating a dot 84 in the calibration image that is closest to the registration point 86. In other words, the dot 84 closest to the registration point 86 in (u, v) space B and the dot closest to the registration point 86 in (x, y) space A may be identified in operation 820. These two dots are deemed to correspond and are mapped to one another. Identifying which dot of the captured calibration image is closest to the registration point 86 may be done in operation 806 as described above. Specifically, the registration point 86 may be added to the projected calibration image at a location that coincides with the location of one of the dots 84. The identity of a dot of the calibration image closest to the registration point 86 may be determined in the same or a similar manner. As one example, referring to FIG. 14B, the captured dot 141 may be identified as being closest to the registration point 86. As another example, referring to FIG. 15, the dot 65 may be identified as being closest to the registration point 86.

The anchoring process of operation 820 may establish a mapping or correspondence between each captured dot of the captured calibration image (after removal of unnecessary information and optical noise) and a particular dot of the calibration image. For example, the dots shown in FIG. 13 may be mapped to corresponding dots 84 of the calibration image 82 shown in FIG. 4. Accordingly, the operation 820 may map each of the dots of the captured calibration image identified as being projected onto the first display surface 90 to a corresponding dot of the calibration image 82.

Once the dot 141 closest to the registration point 86 in second coordinate space B and the dot closest to the registration point 86 in first coordinate space A have been identified, the correspondence between these dots may be used to establish mappings or correspondences between other dots. For example, the operation 820 may include mapping each dot of the captured calibration image 138 (FIG. 13) to a particular dot 84 of the calibration image 20 (FIG. 4). Mapping may include a recursive row-walking operation. The row-walking operation may include walking to the left and right within rows of the captured calibration image. The row walking operation may begin with the row in which the dot closest to the registration point 86 resides. Referring to FIG. 14B, the walking operation may begin at the dot 141. The row may first be walked to the left of the dot 141, e.g., from sequential dot 17 to dots 16, 15, 14, and 13. The row may next be walked to the right of the dot 141, e.g., to dots 18, 19, 20, and 21.

Figure 15:
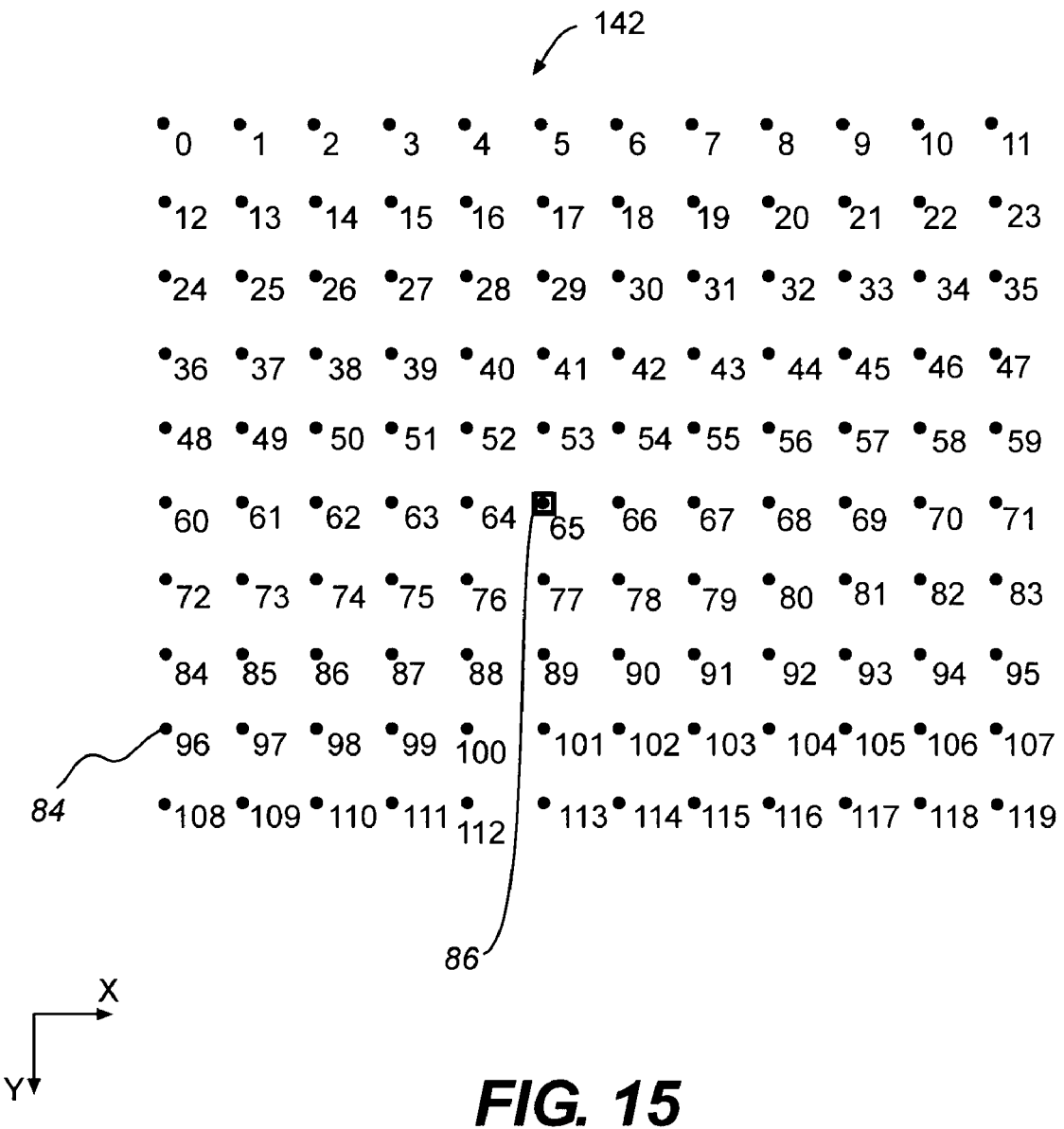
FIG. 15 illustrates an alternative example of a calibration image, which corresponds with the captured calibration images shown in FIGS. 14A and 14B.

FIG. 15 shows an exemplary calibration image 142 corresponding with the captured calibration image 140 (FIGS. 14A, 14B). In FIG. 15, the registration point 86 is shown for illustrative purposes as a rectangle so as not to obscure the dot 84 which shares the same location. As each dot in a row is reached, the dot is mapped to a corresponding dot in the calibration image. For example, sequential dot 16 of the captured calibration image 140 is mapped to sequential dot 64 of the calibration image 142, dot 15 to dot 63, and so on. Once all dots in a row have been walked, the row walking operation may move to the closest dot in the closest row below the row to which the dot 141 belongs, e.g., dot 25 of the captured calibration image 140. The recursive row walking operation may then be repeated for this next lower row. The row walking operation may proceed in this manner until all rows below the registration point 86 have been walked. Similarly, rows above the row to which the registration point 86 belongs may be walked in the same manner. It should be appreciated that the particular order in which the dots are traversed is not critical; any suitable order may be employed. As a correspondence is established between a dot of the captured calibration image and a particular dot of the calibration image, the correspondence is saved in the memory 118. For example, the memory 118 may include an array having an entry for each dot of the calibration image. When a dot of the captured calibration image is mapped to a particular dot of the captured image, a flag in the dot's entry in the matrix is set, the flag indicating that the particular calibration image dot corresponds to a captured dot in the captured calibration image. In one alternative, an array having an entry for each captured and synthetic dot of the captured calibration image may be provided.

Typically, when the calibration image is projected, multiple dots will not be projected onto the first and second display surfaces 90, 92. For example, FIG. 9 shows that multiple dots are not projected onto the first and second surface 90, 92. The captured calibration image does not include the dots that were not projected onto the first and second display surfaces 90, 92. In addition, with the removal of unnecessary optical information and optical noise from the captured calibration image in operation 814, multiple dots that were projected onto the second display surface 92 are removed from the captured calibration image. In an operation 822, the dots of the calibration image that were not projected onto one of the display surfaces in operation 802 or that were eliminated from the captured calibration image in operation 814 are identified.

For each dot of the calibration image identified as not being in the captured calibration image, a "synthetic dot" may be created. Dots not in the captured calibration image may be identified by scanning each dot of the calibration image 82 and inspecting whether the flag indicating correspondence with a captured dot of the captured calibration image, e.g. image 138, has been set. If the flag is not set, the dot may be identified as not being in the captured calibration image. Once the identities of the dots in the calibration image are known, a synthetic calibration dot may be created and added to the captured calibration image 138. In order to add the synthetic calibration dots to the captured calibration image 138, the transformation matrix described above in connection with operation 812 may be calculated. The transformation matrix may be calculated using the respective known locations of the four scale points 88 in the first and second coordinate spaces A and B. Alternatively, the transformation matrix calculated in operation 812 may be reused. The transformation matrix may be used to calculate (u, v) coordinate locations for each of the synthetic calibration dots in the second coordinate space B. In one embodiment, dots of the calibration image that are not projected onto the first display surface are identified, locations of each of the dots identified as not being projected onto the first display surface in the second coordinate space are determined, and a synthetic dot is added to the captured image for each dot identified as not being projected onto the first display surface.

A process for calibrating an image warping projector that requires the capture of the entire calibration image will be performable after adding synthetic dots to the captured calibration image 138 because the process will receive as input the entire calibration image. On the other hand, if a process for calibrating an image warping projector does not require the capture of the entire calibration image, it may not be necessary to perform operation 822. In this case, the adding of synthetic dots or other aspects of the operation 822 may be optional.

Figure 16:
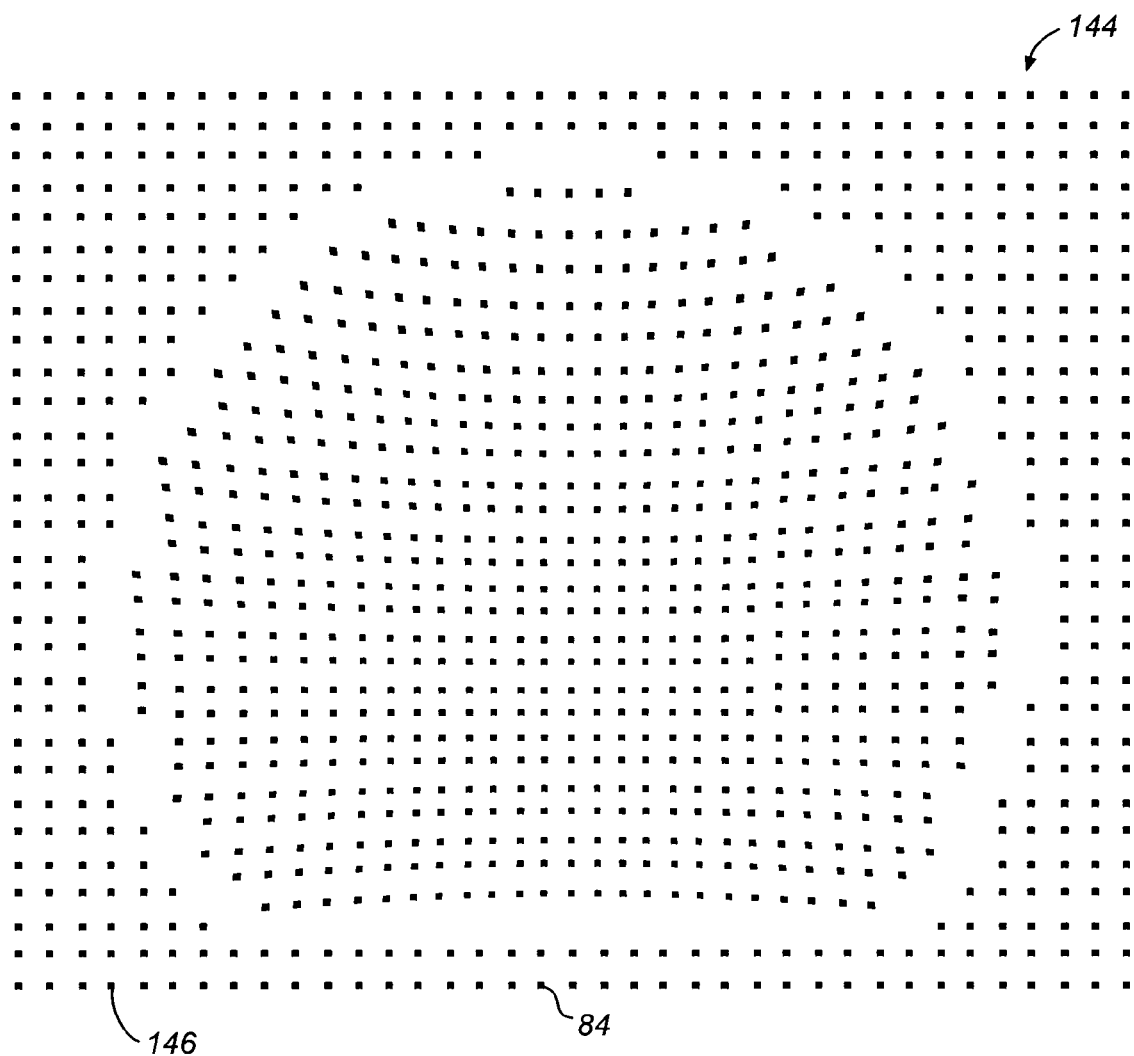
FIG. 16 illustrates one example of a captured calibration image, which includes added synthetic dots.

In an operation 824, the captured calibration image 138 may be saved as a pixel map. If the operation 822 is performed, the saved pixel map includes synthetic dots. FIG. 16 shows one example of a saved captured calibration image 144, which includes synthetic dots, e.g., dot 146, added in operation 822. The saved captured calibration image may include meta data specifying the coordinate locations of the scale points, the registration point, and dots in coordinate space A, and coordinate locations of the captured scale points, the captured registration point, and captured dots and synthetic dots in coordinate space B. The meta data saved with the captured calibration image may also include sequence, row, or other calculated information. Alternatively, these coordinate locations may be saved in one or more files separate from the pixel map of the captured calibration image. In another alternative, coordinate locations and other calculated information may be saved in a file in lieu of saving the captured calibration image 138 may be saved as a pixel map. One of ordinary skill will understand that the various coordinate locations and calculated information may be provided in any manner suitable as input to a process for obtaining one or more offset values or one or more inverse offset values.

In operation 826, the saved captured calibration image 144 may be provided as an input to a process for obtaining one or more offset values or one or more inverse offset values for vertices as described in our co-pending Apps. '180 and '153. Determined offset values or inverse offset values may be provided in table format. A table may have one entry for each quadrilateral. In one embodiment, a pixel map of the captured calibration image may be provided as input. The captured calibration image may be provided with meta data specifying coordinate locations as described in the previous paragraph.

In one alternative, one or more files specifying coordinate locations of the scale points, the registration point, and dots in coordinate space A, and coordinate locations of the captured scale points, the captured registration point, and captured dots and synthetic dots in coordinate space B may be provided as input to the process for obtaining offset values or inverse offset values for vertices.

As described in co-pending Apps. '180 and '153, the coordinate space A or B may be divided into quadrilaterals. Each quadrilateral may have four vertexes, and each vertex has a coordinate location in its coordinate space. In one embodiment, the dots 84 may correspond with vertices. An offset is a distance in one coordinate space, e.g., either coordinate space A or B. As one example, an offset may be measured from an original dot or vertex in the calibration image in coordinate space A. The offset may be measured to a location of a corresponding dot or vertex in the captured calibration image—after the corresponding dot's location has been mapped from coordinate space B into coordinate space A. The mapping of the corresponding dot or vertex into coordinate space A may be accomplished using a projective mapping technique. In one embodiment, data for performing the projective mapping technique may be obtained from the pixel map of the captured calibration image 138 saved in operation 824. Thus, an offset may be a difference, in coordinate space A, between the location of an original dot or vertex in the calibration image and a corresponding dot or vertex in the captured calibration image (after the corresponding dot's location has been mapped from coordinate space B into coordinate space A). An inverse offset value is also a distance in one coordinate space. Similarly, an inverse offset value may also be measured from an original dot or vertex in the calibration image in coordinate space A. However, the inverse offset value may be measured to a location in coordinate space A determined using a projective mapping technique. Specifically, a projective mapping technique may be used to map a corresponding dot or vertex in the captured calibration image from coordinate space B into coordinate space A. Again, data for performing the projective mapping technique may be obtained from the pixel map of the captured calibration image 138 saved in operation 824. A table of offset values or inverse offset values may contain an offset or an inverse offset, respectively, for each dot or vertex. The inverse offset table may be used in an image warping process. The inverse offsets, when applied to a projected image, may partially or completely compensate for distortion introduced by the surface. The creation and use of offsets and inverse offsets is further described in our co-pending Apps. '180 and '153.

An inverse offset table or file for pre-warping a source image may be transferred from the first computer system 102 to the second computer system 104 via the communications link 114 or by any other suitable means as described above. The switch 106 may be set so as to couple the second computer system 104 with the image source 108. In addition, the second system 104 may be placed in its first mode of operation in which it outputs distorted or warped images according to an inverse offset table or warp file. When a source image is received from the image source 108, the image is pre-warped by the second system 104 and projected onto the display surface by the projector 60, the warping of the image compensates for the non-planar topography of the surface to produce an image that appears substantially undistorted.

Figure 17:
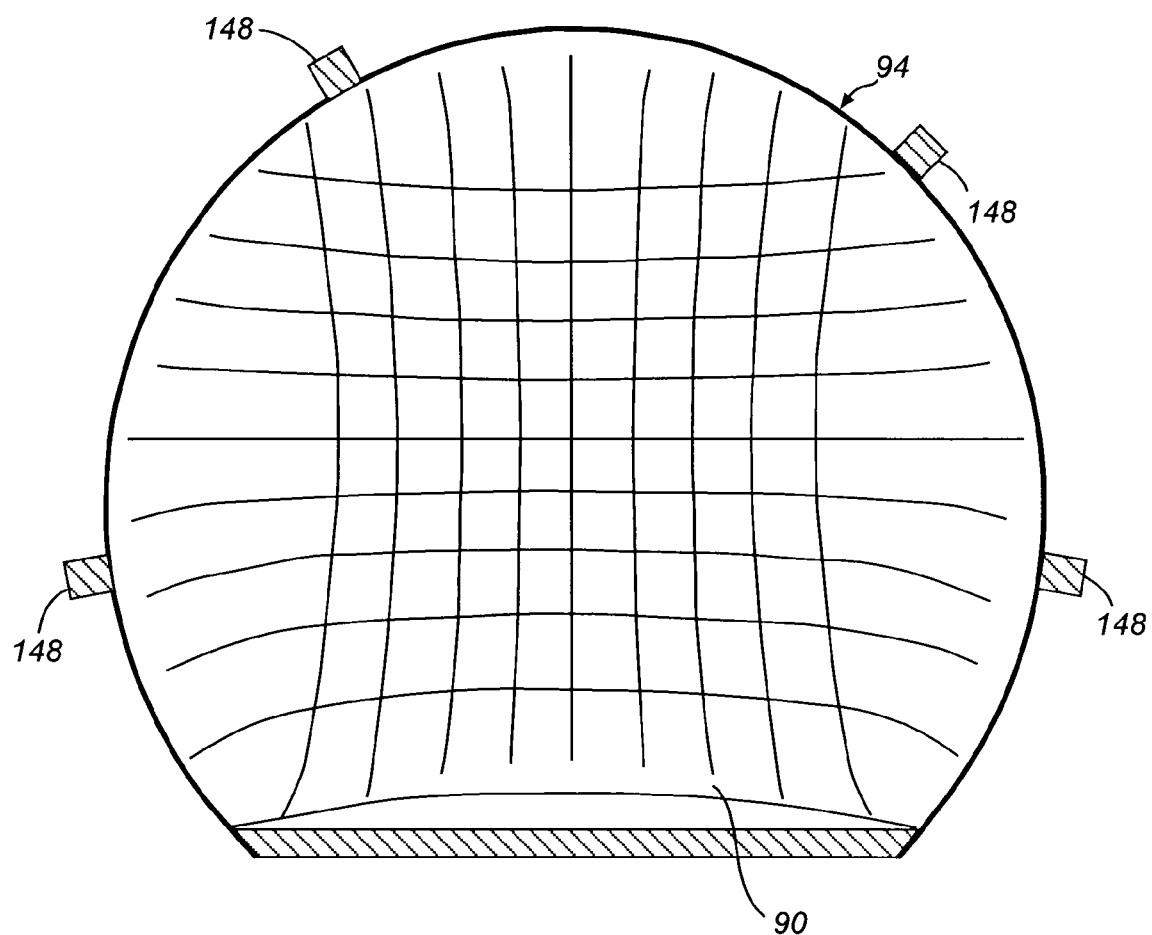
FIG. 17 is a front view of the first display surface of FIG. 5, and four second display surfaces according to one alternative embodiment.
Figure 18A:
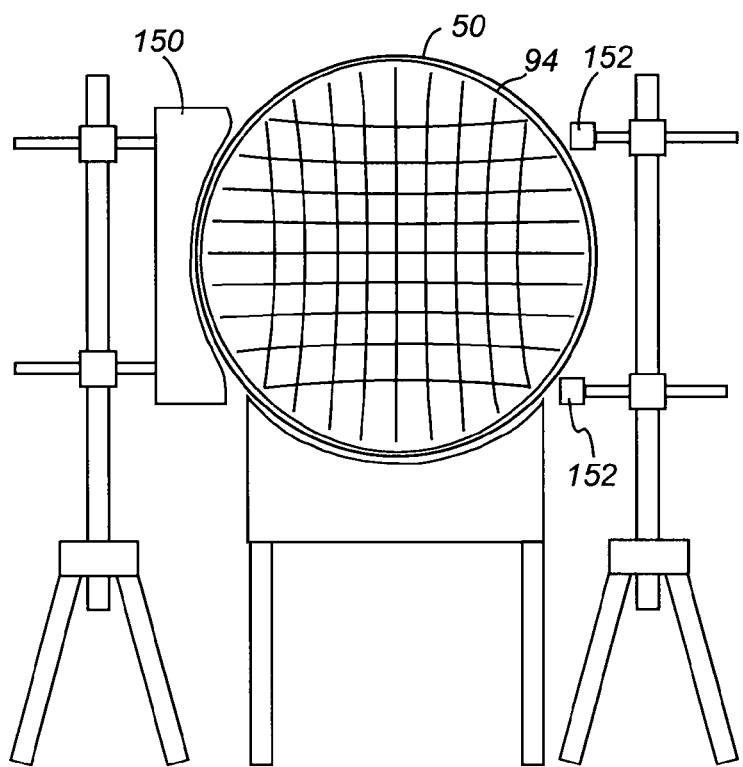
FIGS. 18A and 18B are front views of the first display surface of FIG. 1 shown with one or more second display surfaces according to alternative embodiments.
Figure 18B:
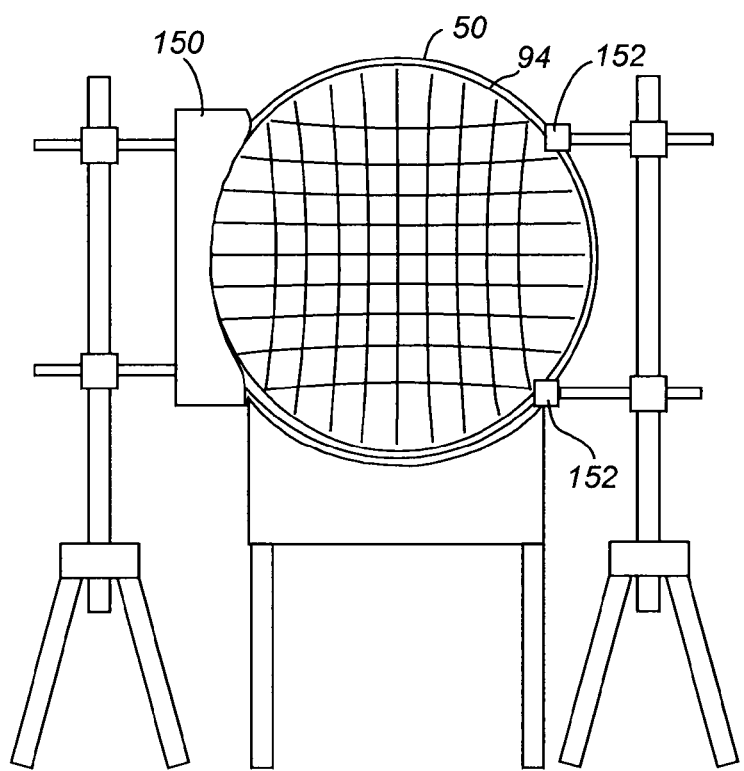

FIG. 17 shows one alternative to the second display surface 92 shown in FIG. 5. FIG. 17 shows four display second surfaces 148. FIGS. 18A and 18B shows two additional alternative second display surfaces 150, 152. One or more second display surface or surfaces may be permanently attached to, or attached but detachable from, a first display surface. In addition, one or more second display surface or surfaces may be supported by any suitable structure separate from the first display surface 90, on example of which is shown in FIGS. 18A and 18B.

In the embodiments described above, the first display surface may be non-planar. However, in one embodiment, the first display surface may be a planar surface having an outer boundary which is non-rectangular. For example, the first display surface may be planar, having an outer boundary that is elliptical, where the source and source calibration images may be rectangular. The first display surface may be oriented so that it is at angle to the axis of projection that is sufficient to introduce a keystone effect, i.e., one or more angles between the axis and the plane may be non-normal angles. The first display surface may be positioned such that it is not normal or not approximately normal to the axis of projection. Should it not be feasible or convenient to re-position the first display surface so that it is normal or approximately normal to the axis of projection, the principles described in this specification may be employed to calibrate an image warping projector so that it projects pre-warped source images onto the first display surface that do not exhibit the keystoning effect.

As mentioned, typically the three or more scale points are not initially projected onto the second surface 92. However, the calibration image 82 preferably does not overlap the first surface by a substantial amount. For example, 10-20 percent of the area of a projected calibration image may overlap both the first and second display surfaces. In some circumstances, a high percent of the area of a calibration image may be projected onto a first display surface while at the same time the remainder of the calibration image is projected onto the one or more second display surfaces. For example, the second display surface may be large enough (or the projection overlap may be small enough) that the portion of the projected calibration image not impinging on the first surface is intercepted by and appears on the second display surface. In other words, in some circumstances all of the three or more scale points may initially be projected onto the second surface or surfaces. The operation 804, which provides for changing the locations of the scale points 88 in the first coordinate space A, would not be needed in these circumstances. Accordingly, in one embodiment, the operation 804 may be optional.

It is not essential that the embodiments described in this specification be used with methods, systems, and apparatus for projecting an image onto a non-planar surface that include or rely on a calibration process that requires the capturing of an entire calibration image. One embodiment may be used with methods, systems, and apparatus for projecting an image onto a non-planar surface that does not include or rely on a calibration process that requires the capturing of an entire calibration image.

In this specification, the camera 62 has been described as being located on a viewing side and the projector 60 as being located on a projection side of the first display surface 50. However, it is not critical that the projector 60 and camera 62 be arranged shown in this configuration. In one alternative embodiment, the camera 62 and the projector 60 may both be located on a side of a display surface on which the viewer views the projected image.

Embodiments described in this specification may be used in calibration operations for a curved projection screen in a home theatre, for a vehicle simulator having a curved projection screen, or in other similar applications. Embodiments described in this specification are especially suited to applications where the system 100 or the first display surface or both are intended for portable use. Where a system 100 is used at trade shows or in educational contexts, the system 100 may be taken down, transported, and set up frequently. The inventors have observed that the embodiments described in this specification significantly reduce the set up time of a projection system.

It should be understood that the embodiments may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed may be referred to in terms, such as producing, identifying, determining, or comparing.

Any of the operations described in this specification that form part of the embodiments are useful machine operations. As described above, some embodiments relate to a device or an apparatus specially constructed for performing these operations. It should be appreciated, however, that the embodiments may be employed in a general purpose computer selectively activated or configured by a computer program stored in the computer. In particular, various general purpose computer systems may be used with computer programs written in accordance with the teachings herein. Accordingly, it should be understood that the embodiments can also be embodied as computer readable code on a computer readable medium.

A computer readable medium is any data storage device that can store data which can be thereafter read by a computer system. Examples of the computer readable medium include, among other things, floppy disks, memory cards, hard drives, RAMs, ROMs, EPROMs, compact disks, and magnetic tapes. A computer usable medium includes a computer readable program, wherein the computer readable program when executed on a computer causes the computer to perform operations according to the program. A computer usable medium includes a computer readable medium.

In this description, references may be made to "one embodiment" or "an embodiment." These references mean that a particular feature, structure, or characteristic described in connection with the embodiment is included in at least one embodiment of the claimed inventions. Thus, the phrases "in one embodiment" or "an embodiment" in various places are not necessarily all referring to the same embodiment. Furthermore, particular features, structures, or characteristics may be combined in one or more embodiments.

Although embodiments have been described in some detail for purposes of clarity of understanding, it will be apparent that certain changes and modifications may be practiced within the scope of the appended claims. Accordingly, the described embodiments are to be considered as illustrative and not restrictive, and the claimed inventions are not to be limited to the details given herein, but may be modified within the scope and equivalents of the appended claims. Further, the terms and expressions which have been employed in the foregoing specification are used as terms of description and not of limitation, and there is no intention in the use of such terms and expressions to exclude equivalents of the features shown and described or portions thereof, it being recognized that the scope of the inventions are defined and limited only by the claims which follow.

The invention claimed is:

1. A method for creating input for an image warping calibration process, comprising:
   projecting a calibration image with a projector at a first display surface and one or more second display surfaces, the calibration image including four or more dots and three or more scale points, the locations of the dots and scale points being defined in a first coordinate space;
   determining a location for a registration point in the first coordinate space and adding the registration point to the calibration image;
   capturing the projected calibration image with an imaging device, the captured image including a captured registration point, captured scale points, and captured dots;
   identifying a location of the captured registration point in a second coordinate space;
   identifying a location of each captured scale point in the second coordinate space;
   identifying captured dots that are projected onto the first display surface and their locations in the second coordinate space;
   mapping each of the captured dots identified as being projected onto the first display surface to a corresponding dot of the calibration image; and
   identifying dots of the calibration image that are not projected onto the first display surface, determining locations of each of the dots identified as not being projected onto the first display surface in the second coordinate space, and adding a synthetic dot to the captured image for each dot identified as not being projected onto the first display surface.

2. The method of claim 1, further comprising modifying a location of one or more of the scale points.

3. The method of claim 2, further comprising identifying a location for the each of the scale points in the second coordinate space subsequent to modifying the location of the one or more scale points.

4. The method of claim 1, wherein the calibration image includes four scale points.

5. The method of claim 1, further comprising providing the captured image as input to a process for determining one or more inverse offsets.

6. The method of claim 1, wherein the determining of locations of each of the dots identified as not being projected onto the first display surface in the second coordinate space includes performing a projective mapping.

7. The method of claim 1, further comprising removing unnecessary information from the captured image.

8. The method of claim 1, wherein the identifying of captured dots that are projected onto the first display surface and their locations in the second coordinate space includes sequencing the captured dots.

9. The method of claim 1, wherein the first display surface is non-planar.

10. The method of claim 1, wherein the first display surface is planar and the first display surface lies in a plane making one or more non-normal angles with an axis of projection of the projector.

11. The method of claim 1, wherein the first display surface has a non-rectangular, two-dimensional profile in a plane that is normal to an axis of projection of the projector.

12. The method of claim 11, wherein the calibration image has a two-dimensional profile that is rectangular.

13. The method of claim 1, wherein the one or more second display surfaces define a plane that is normal to an axis of projection of the projector.

14. A system for creating input for an image warping calibration process, comprising:
   a projector to project a calibration image at a first and one or more second display surfaces, the calibration image including four or more dots and three or more scale points, the locations of the dots and scale points being defined in a first coordinate space;
   an imaging device to capture one or more projections of the calibration image, the captured image, the captured image including a captured registration point, captured scale points, and captured dots; and
   a first computer to:
      provide the calibration image to the projector,
      modify of a location of one or more of the scale points in response to a user input,
      determine a location for a registration point in the first coordinate space and add the registration point to the calibration image,
      identify a location of the captured registration point in a second coordinate space;
      identify a location of each captured scale point in the second coordinate space;
      identify captured dots that are projected onto the first display surface and their locations in the second coordinate space;
      map each of the captured dots identified as being projected onto the first display surface to a corresponding dot of the calibration image; and
      identify dots of the calibration image that are not projected onto the first display surface, determine locations of each of the dots identified as not being projected onto the first display surface in the second coordinate space, and add a synthetic dot to the captured image for each dot identified as not being projected onto the first display surface.

15. The system of claim 14, wherein the first computer identifies a location for the each of the scale points in the second coordinate space.

16. The system of claim 14, wherein the calibration image includes four scale points.

17. The system of claim 14, wherein the first computer provides the captured image as input to a process for determining one or more inverse offsets.

18. The system of claim 14, wherein the determining of locations of each of the dots identified as not being projected onto the first display surface in the second coordinate space includes performing a projective mapping.

19. The system of claim 14, wherein the identifying of captured dots that are projected onto the first display surface and their locations in the second coordinate space includes sequencing the captured dots.

20. The system of claim 14, wherein the first display surface is non-planar.

21. The system of claim 14, wherein the first display surface is planar and the first display surface lies in a plane making one or more non-normal angles with an axis of projection of the projector.

22. The system of claim 14, wherein the first display surface has a non-rectangular, two-dimensional profile in a plane that is normal to an axis of projection of the projector.

23. The system of claim 22, wherein the calibration image has a two-dimensional profile that is rectangular.

24. The system of claim 14, wherein the one or more second display surfaces define a plane that is normal to an axis of projection of the projector.

25. A computer program product for creating input for an image warping calibration process, comprising a non-transitory computer usable medium including a computer readable program, wherein the computer readable program when executed on a computer causes the computer to:

provide a calibration image to a projector for projecting at a first display surface and one or more second display surfaces, the calibration image including four or more dots and three or more scale points, the locations of the dots and scale points being defined in a first coordinate space;

determine a location for a registration point in the first coordinate space and add the registration point to the calibration image;

receive a captured image, the captured image being created by a capture of the projected calibration image by an imaging device, the captured image including a captured registration point, captured scale points, and captured dots;

identify a location of the captured registration point in a second coordinate space;

identify a location of each captured scale point in the second coordinate space;

identify captured dots that are projected onto the first display surface and their locations in the second coordinate space;

map each of the captured dots identified as being projected onto the first display surface to a corresponding dot of the calibration image; and identify dots of the calibration image that are not projected onto the first display surface, determine locations of each of the dots identified as not being projected onto the first display surface in the second coordinate space, and add a synthetic dot to the captured image for each dot identified as not being projected onto the first display surface.

26. The program product of claim 25, further comprising causing the computer to modify a location of one or more of the scale points in response to a command.

27. The program product of claim 26, further comprising causing the computer to identify a location for the each of the scale points in the second coordinate space subsequent to modifying the location of the one or more scale points.

28. The program product of claim 25, wherein the calibration image includes four scale points.

29. The program product of claim 25, further comprising causing the computer to provide the captured image as input to a process for determining one or more inverse offsets.

30. The program product of claim 25, wherein the determining of locations of each of the dots identified as not being projected onto the first display surface in the second coordinate space includes performing a projective mapping.

31. The program product of claim 25, wherein the first display surface is non-planar.

* * * * *